(12) United States Patent
Speidel

(10) Patent No.: US 12,311,573 B2
(45) Date of Patent: May 27, 2025

(54) METHOD AND APPARATUS FOR PRODUCING A BOARD FOR PRODUCTION OF PANELS, BOARD FOR PRODUCTION OF PANELS, METHOD AND APPARATUS FOR PRODUCING PANELS, AND PANEL PRODUCIBLE BY THE METHOD

(71) Applicant: Lignum Technologies AG, Niederteufen (CH)

(72) Inventor: Hannes Speidel, Neftenbach (CH)

(73) Assignee: XYLO TECHNOLOGIES AG, Niederteufen (CH)

( * ) Notice: Subject to any disclaimer, the term of this patent is extended or adjusted under 35 U.S.C. 154(b) by 1213 days.

(21) Appl. No.: 17/052,274

(22) PCT Filed: May 2, 2018

(86) PCT No.: PCT/EP2018/061143
§ 371 (c)(1),
(2) Date: Nov. 2, 2020

(87) PCT Pub. No.: WO2019/210941
PCT Pub. Date: Nov. 7, 2019

(65) Prior Publication Data
US 2021/0170627 A1    Jun. 10, 2021

(51) Int. Cl.
*B27N 7/00* (2006.01)
*B27N 3/02* (2006.01)
(Continued)

(52) U.S. Cl.
CPC ............ *B27N 7/005* (2013.01); *B27N 3/02* (2013.01); *B27N 3/04* (2013.01); *B27N 3/14* (2013.01);
(Continued)

(58) Field of Classification Search
None
See application file for complete search history.

(56) References Cited

U.S. PATENT DOCUMENTS

| 8,435,022 B2 | 5/2013 | Burckhardt et al. |
| 9,969,101 B2 | 5/2018 | Kalwa et al. |
(Continued)

FOREIGN PATENT DOCUMENTS

| AU | 2014284755 A1 | 12/2015 |
| CN | 1655926 A | 8/2005 |
(Continued)

OTHER PUBLICATIONS

International Search Report, issued in International Application No. PCT/EP2018/061142, dated Apr. 29, 2019, pp. 1-5, European Patent Office, Rijswijk, Netherlands.
(Continued)

*Primary Examiner* — Michael N Orlando
*Assistant Examiner* — Abhishek A Patwardhan
(74) *Attorney, Agent, or Firm* — Crowell & Moring LLP

(57) ABSTRACT

A method is provided comprising: providing particulate material comprising or consisting of particulate wooden material, producing glued particulate wooden material by applying an adhesive to the particulate wooden material, forming a spreading material mat by homogeneously spreading the glued particulate material onto a conveyor on which the spread glued particulate material is conveyed in a conveying direction, and producing a board by pressing the spreading material mat during conveying on the conveyor. Furthermore, a reinforcement material is applied to the spread glued particulate material perpendicular to the conveying direction during forming the spreading material mat and/or after forming the spreading material mat before any pressing of the spreading material mat such that the spread-
(Continued)

ing material mat has at least one longitudinal reinforcement zone containing the reinforcement material. Boards can be obtained, from which panels can be produced having reinforced longitudinal and/or transversal edges.

18 Claims, 6 Drawing Sheets

(51) Int. Cl.
| | |
|---|---|
| B27N 3/04 | (2006.01) |
| B27N 3/14 | (2006.01) |
| B27N 3/18 | (2006.01) |
| B27N 3/24 | (2006.01) |
| E04F 13/08 | (2006.01) |
| E04F 13/16 | (2006.01) |
| E04F 15/02 | (2006.01) |
| E04F 15/10 | (2006.01) |

(52) U.S. Cl.
CPC .............. *B27N 3/18* (2013.01); *B27N 3/24* (2013.01); *E04F 13/16* (2013.01); *E04F 15/102* (2013.01); *E04F 13/0894* (2013.01); *E04F 15/02038* (2013.01); *E04F 2201/043* (2013.01)

(56) References Cited

U.S. PATENT DOCUMENTS

| | | | |
|---|---|---|---|
| 2015/0017461 A1* | 1/2015 | Lindgren | B27N 3/04 428/528 |
| 2021/0053249 A1 | 2/2021 | Speidel | |

FOREIGN PATENT DOCUMENTS

| | | |
|---|---|---|
| CN | 101827691 A | 9/2010 |
| CN | 102802895 A | 11/2012 |
| CN | 102821921 A | 12/2012 |
| CN | 104520080 A | 4/2015 |
| CN | 107580538 A | 1/2018 |
| DE | 10 2010 002 066 A1 | 8/2011 |
| DE | 102010002066 | 8/2011 |
| EP | 2 241 426 A1 | 10/2010 |
| EP | 2 146 024 B1 | 2/2013 |
| EP | 2 147 762 B1 | 10/2013 |
| EP | 2 789 438 A1 | 10/2014 |
| EP | 2 125 312 B1 | 3/2015 |
| EP | 2 397 291 B1 | 9/2016 |
| EP | 2 628 580 B1 | 4/2017 |
| EP | 3 184 272 A2 | 6/2017 |
| WO | WO2011101152 A1 | 8/2011 |
| WO | WO 2015/002599 | 1/2015 |
| WO | WO 2015/169647 A1 | 11/2015 |

OTHER PUBLICATIONS

International Search Report, issued in International Application No. PCT/EP2018/061143, dated Apr. 29, 2019, pp. 1-5, European Patent Office, Rijswijk, Netherlands.
U.S. Appl. No. 17/052,274, filed Nov. 2, 2020.
Chinese Office Action with English Translation, dated Sep. 1, 2021, pp. 1-14, Issued in Chinese Patent Application 201880093072.1, China National Intellectual Property Administration, Beijing City, China.
Chinese Office Action with English Translation, dated Mar. 8, 2022, pp. 1-9, Issued in Chinese Patent Application 201880093072.1, China National Intellectual Property Administration, Beijing City, China.
Eurasian Office Action for Eurasian Patent application No. 202092299, dated Sep. 21, 2021, pp 1-4, The Eurasian Patent Organization Patent Office, 2, M. Cherkasskv per., Moscow 109012.

\* cited by examiner

METHOD AND APPARATUS FOR PRODUCING A BOARD FOR PRODUCTION OF PANELS, BOARD FOR PRODUCTION OF PANELS, METHOD AND APPARATUS FOR PRODUCING PANELS, AND PANEL PRODUCIBLE BY THE METHOD

CROSS-REFERENCE TO RELATED APPLICATIONS

This application is a 371 nationalization of international patent application PCT/EP2018/061143 filed May 2, 2018, the entire contents which is hereby incorporated by reference.

DETAILED DESCRIPTION

Figure 1:
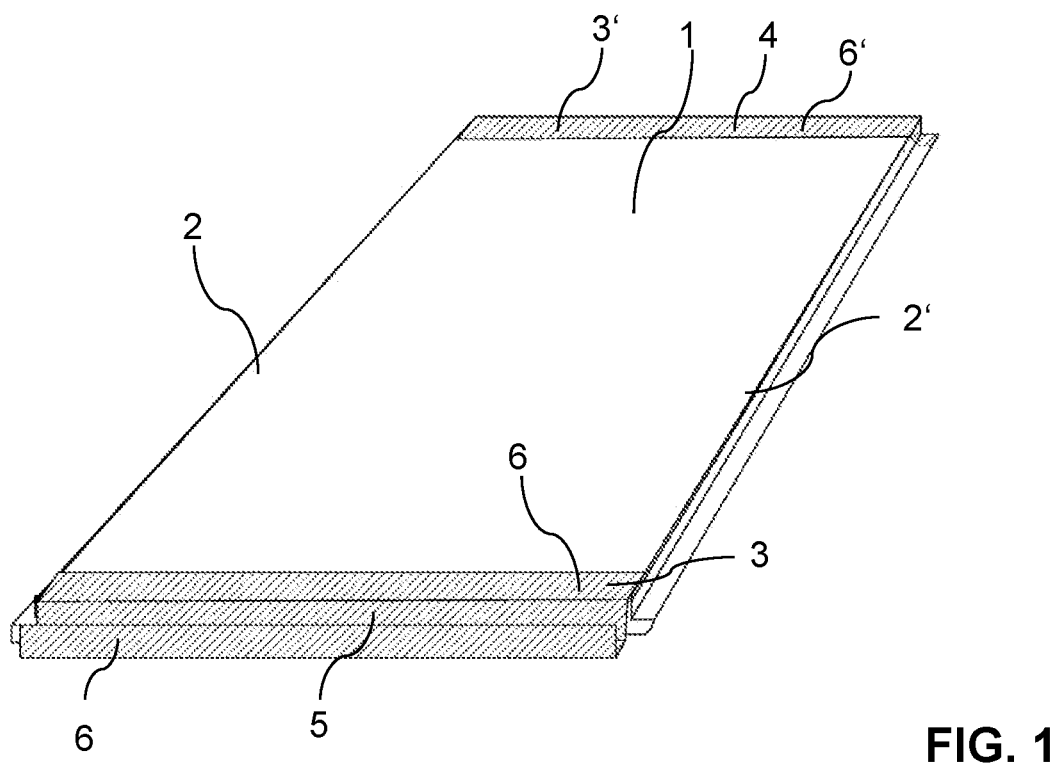
FIG. 1 shows a perspective view of a specific embodiment of a panel 1 according to the present invention.

The present invention relates to a method of producing a board for production of panels. The method comprises the steps of providing particulate material comprising or consisting of particulate wooden material, producing glued particulate wooden material by applying an adhesive to the particulate wooden material, forming a spreading material mat by homogeneously spreading the glued particulate material onto a conveyor on which the spread glued particulate material is conveyed in a conveying direction, and producing a board by pressing the spreading material mat during conveying on the conveyor. Furthermore, a reinforcement material is applied to the spread glued particulate material perpendicular to the conveying direction during forming the spreading material mat and/or after forming the spreading material mat before any pressing of the spreading material mat such that the spreading material mat has at least one longitudinal reinforcement zone containing the reinforcement material. With the method according to the invention, boards can be obtained from which panels can be produced which have reinforced longitudinal and/or transversal edges. The present invention is also related to an apparatus for producing a board for production of panels, to a board for production of panels, to a method of producing a spreading material mat, to a spreading material mat producible by this method, to a method and an apparatus for producing panels, to a panel producible by such method, and to the use of the panel.

According to the state of the art, panels of wooden material, such as medium- or high-density fiber panels (MDF, HDF), are mainly produced by homogeneously spreading a mat of glued wood fibers onto a conveyor belt in order to obtain a fiber mat, compacting the fiber mat in a continuous press in which the glue or resin is then also cured at elevated temperatures, thereby producing a large or "endless" (MDF/HDF) board. EP 2 125 312 discloses an example of a spreading material plant for the spreading part of this process. The board is then covered with systems of decorative and wear resistant layers, wherein counter draw and sound absorption of insulation layers can also be added to such boards. The boards are subsequently cut to the desired size of panels and then locking profile elements, such as tongues and grooves, are machined, e.g. milled, to the longitudinal (and/or transversal) edges of the panels.

Panels obtained by such production process consist of the same "core" material throughout the panel. However, the milled profile edges need to withstand much higher mechanical loading than the rest of the panel. Thus, such profile- and corner elements at the edges of the panel tend to break off during longtime usage. Furthermore, water (or moisture and humidity) from spills or from wet cleaning tends to accumulate in such profile- and corner elements at the edges of the panel, so swelling may occur there since the water adsorbed into the panel core.

In the state of the art, it is known to improve the material quality of the profiles is to add more (and rather expensive) glue/resin to the entire board. WO 2015/169647 discloses a manufacturing method for a wood-composite (PVC-) material. EP 2 397 291 teaches to add an expanding and hardening mass to a conventional production process to improve strength and resistance to humidity. EP 2 146 024 discloses flooring panels with sealing and "reinforcement" means.

However, when glue is added to the entire board, a very high amount of glue is needed, which results in the disadvantage that the costs of the production of the boards and panels increase significantly.

Thus, methods have been developed in which a cross-linked substance or a reinforcement means is only applied to an edge region of a wood board (EP 2 147 762 B1, EP 2 628 580 B1). Moreover, in EP 3 184 272 A2, a substance is pressed into partial regions of a pre-compressed wooden fibre cake by using a pressure generator for generating an overpressure. Furthermore, EP 2 241 426 A1 describes a method in which a pre-compressed fibre cake is subjected to a vacuum and simultaneously an impregnation medium is applied to the fibre cake which is distributed in partial regions of the fibre cake as a result of the vacuum.

However, all of these methods have several disadvantages. Firstly, overpressure or vacuum must be used for inserting and distributing the reinforcement substance in the fibre cake. However, such overpressure or vacuum has a bad influence on the distribution of the adhesive in the fibre cake, which may result in a less stability of the produced board. Furthermore, by using overpressure or vacuum, it is not possible to homogenously distribute the reinforcement substance in precisely defined regions of the fibre cake. In other words, it is not possible with these methods of the state of the art to obtain a board with precisely defined reinforced regions in which the reinforcement substance is homogeneously distributed. Furthermore, when overpressure or vacuum is used for inserting and distributing the reinforcement substance in a fibre cake (such as e.g. in EP 3 184 272 A2 or EP 2 241 426 A1), the fibre cake must be pre-compressed in order to avoid damage or destruction of the accumulated fibres caused by overpressure or vacuum. Thus, an additional pre-compression step is necessary that makes the method more complex, cost-intensive and time-consuming. Furthermore, such pre-compressed fibre cake (as well as an already produced board) exhibits only a relatively low porosity. This relatively low porosity hinders the infiltration of the reinforcement substance into the fibre cake (or into the board) and, thus also for this reason, only an inhomogeneous distribution of the reinforcement substance in the partial regions of fibre cake (or the board) is achieved.

Since an inhomogeneous distribution of the reinforcement substance results in a low mechanical stability of the reinforced regions of the produced board, the reinforced regions of the boards produced with the known methods only have a low mechanical stability. Thus, also the reinforced edges of panels produced from these boards only have a low mechanical stability.

Starting herefrom, it is the object of the present invention to indicate a cost-effective and time-saving method for the production of a board from which panels with reinforced edges can be produced, wherein these reinforced edges have an increased mechanical stability.

According to the invention, a method of producing a board for production of panels is indicated, the method comprising the following steps:
a) Providing particulate material comprising or consisting of particulate wooden material,
b) Producing glued particulate material by applying an adhesive to the particulate material,
c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
d) Producing a board by pressing the spreading material mat, According to the invention, a reinforcement material is applied to the spread glued particulate material perpendicular to the conveying direction
during forming the spreading material mat and/or
after forming the spreading material mat and before any pressing of the spreading material mat
such that the spreading material mat has at least one transversal reinforcement zone containing the reinforcement material.

The application of the reinforcement material is accomplished by spraying, sputtering and/or injecting the reinforcement material onto and/or into the spread glued particulate material. Thus, an easy, fast and precise application of the reinforcement material is possible. Furthermore, the reinforcement material can be applied while the spread glued particulate material is continuously conveyed on the conveyor.

In step a), particulate material is provided. The particulate material comprises or consists of particulate wooden material. Preferably, the particulate material is particulate wooden material. The particulate material may further comprise components of non-wooden material, such as particulate plastic material. In general, the particulate material and the particulate wooden material can be present in any form. It is also possible to use particulate material and particulate wooden material that is present in various forms. For example, wooden fibres, wooden strands, wooden chips, or mixtures thereof may be used as particulate wooden material.

In step b), an adhesive is applied to the particulate material provided in step a) and, thus, glued particulate material is produced. For example, the adhesive is mixed with the particulate material. In general, any adhesive that is suitable for gluing wooden particulate material can be used. Preferably, the adhesive is wood glue. For example, the adhesive is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof.

In step c), a spreading material mat is formed by homogeneously spreading the glued particulate material produced in step b) onto a conveyor on which the spread glued particulate material is conveyed in a conveying direction. In this regard, the glued particulate material is spread onto the conveyor over a length of a spreading sector extending in conveying direction such that, in conveying direction, the spread glued particulate material is accumulated to the spreading material mat over the length of the spreading sector. Thus, the spreading material mat is produced by accumulating the glued particulate material. In this context, the spreading sector is a local sector in which the glued particulate material is spread onto the conveyor. The spreading sector has a length that extends in conveying direction and has a width that preferably extends over the whole width of the conveyor.

The glued particulate material may be spread continuously or discontinuously onto the conveyor. Thus, the spread glued particulate material may be accumulated continuously or discontinuously to the spreading material mat over the length of the spreading sector. Preferably, the spread glued particulate material is continuously conveyed in the conveying direction.

The formed spreading material mat has a longitudinal direction and a transversal direction that is perpendicular to the longitudinal direction of the spreading material mat. Furthermore, the longitudinal direction of the spreading material mat is parallel to the conveying direction, while the transversal direction of the spreading material mat is perpendicular to the conveying direction.

The spreading material mat has two longitudinal edges, i.e. two edges that are parallel to the longitudinal direction of the spreading material mat. Due to the spreading process of the glued particulate material, the longitudinal edges of the spreading material mat may be uneven. However, between steps c) and d), the longitudinal edges of the spreading material mat may be subjected to a cutting process resulting in the spreading material mat having two even longitudinal edges.

According to the invention, the longitudinal direction of a body (e.g. a spreading material mat, a board, a panel, etc.) is the direction of the long axis of the body while the transversal direction of a body (e.g. a spreading material mat, a board, a panel, etc.) is the direction of the short axis of the body. A longitudinal edge of a body is an edge parallel to the longitudinal direction of the body while a transversal edge of a body is an edge parallel to the transversal direction of the body.

In step d), a board is produced by pressing the spreading material mat formed in step c). For example, the pressing may be conducted by using a continuous band press. Preferably, the pressing of the spreading material takes place while the spreading material mat is conveyed on a conveyor, e.g. on the conveyor used in step b). Alternatively, the pressing of the spreading material mat may also take place at a point when the spreading material mat is not conveyed.

According to the invention, the spreading material mat has at least one transversal reinforcement zone. In this context, a reinforcement zone is a zone of the spreading material mat in which the reinforcement material is located. The at least one transversal reinforcement zone is transversal, which means that the at least one transversal reinforcement zone is parallel to the transversal direction of the spreading material mat. The at least one transversal reinforcement zone has two transversal edges, i.e. edges being parallel to the transversal direction of the spreading material mat. Preferably, the at least one transversal reinforcement zone has the form of a line, a stripe, or a bar, in particular a straight line, a straight stripe, or a straight bar.

The transversal reinforcement zone may include a transversal cutting zone that does not contain the reinforcement material, i.e. a transversal cutting zone in which the reinforcement material is not located. When the board is cut in this cutting zone, a simplified cutting of the board is possible while, at the edges of the resulting panels, a reinforcement zone is located.

The transversal reinforcement zone is only a zone, i.e. a partial region, of the spreading material mat. In detail, the transversal reinforcement zone has a limited extent in the longitudinal direction of the spreading material mat. In other words, the transversal reinforcement zone does not extend over the whole extent of the spreading material mat in its longitudinal direction. In other words, the extent of the transversal reinforcement zone in the longitudinal direction of the spreading material mat is smaller than the extent of the spreading material mat in its longitudinal direction.

Preferably, the at least one transversal reinforcement zone extends over the whole width of the spreading material mat, i.e. over the whole extent of the spreading material mat in its transversal direction.

Preferably, the at least one transversal reinforcement zone has a constant width, i.e. has a constant extent in the longitudinal direction of the spreading material mat.

The at least one transversal reinforcement zone is obtained
by applying a reinforcement material to the spread glued particulate material perpendicular to the conveying direction during forming the spreading material mat, i.e. during step c), and/or
by applying a reinforcement material to the spread glued particulate material perpendicular to the conveying direction after forming the spreading material mat, i.e. after step c), and before any pressing of the spreading material mat.

Since, thus, the spreading material mat used in step d) exhibits at least one transversal reinforcement zone containing the reinforcement material, also the board produced by pressing the spreading material mat in step d) exhibits at least one transversal reinforcement zone containing the reinforcement material.

The reinforcement material is applied to the spread glued particulate material, i.e. the reinforcement material is applied before step d), and thus before pressing the spreading material mat to a board. Furthermore, the reinforcement material is applied to the spread glued particulate material
during forming the spreading material mat, and/or
after forming the spreading material mat and before any pressing of the spreading material mat.

In this context, the expression "any pressing" also includes any prepressing, any compressing and any pre-compressing. Thus, it is clear that the reinforcement material is applied to the spread glued particulate material before any pressing step, before any pre-pressing step, before any compressing step, and before any pre-compressing step. In other words, the reinforcement material is applied to the non-pre-pressed (or non-pre-compressed) spread glued particulate material.

The at least one reinforcement material is applied to the spread glued particulate material perpendicular to the conveying direction. In other words, the reinforcement material is applied to at least one predefined zone of the spread glued particulate material wherein this at least one predefined zone is perpendicular to the conveying direction. Since the at least one reinforcement zone is a zone of the spreading material mat in which the reinforcement material is located, the at least one reinforcement zone corresponds to said at least one predefined zone.

The at least one reinforcement material is applied to the spread glued particulate material while the spread glued particulate material is conveyed on the conveyor.

According to the invention, it is essential that the reinforcement material is applied to the spread glued particulate material
during forming the spreading material mat, and/or
after forming the spreading material mat and before any pressing of the spreading material mat.

Since at these points of the method, i.e. before (any) pressing (i.e. also before any compressing, any pre-pressing, any pre-compressing) of the spreading material mat, the spreading material mat exhibits a high porosity, the reinforcement material can better infiltrate into the spreading material mat and thus is distributed more homogeneously in the reinforcement zones. Due to this homogeneous distribution, the at least one reinforcement zone of the produced board can withstand higher mechanical loading, i.e. the at least one reinforcement zone of the produced board has a higher mechanical stability. Furthermore, panels can be produced from the produced board by cutting the board in its transversal direction in the at least one transversal reinforcement zone.

In this way, panels are obtained that have reinforced edges that can withstand higher mechanical loading, i.e. the reinforced edges have a higher mechanical stability.

Thus, the at least one transversal reinforcement zone is preferably a predefined zone in which the produced board should be cut (in its transversal direction) in panels in the future such that each of the resulting panels comprises at least one reinforced edge.

Since the reinforcement material is applied to the spread glued particulate material
    during forming the spreading material mat, and/or
    after forming the spreading material mat and before any pressing of the spreading material mat,
a precise appliance of the reinforcement material is possible, i.e. it is possible to homogeneously distribute the reinforcement material in precisely defined regions of the spread glued particulate material. In other words, it is possible with the method according to the present invention to obtain a board with one or more precisely defined reinforced regions in which the reinforcement substance is homogeneously distributed.

Moreover, using overpressure or vacuum for distributing the already applied reinforcement material is not necessary in the method according to the present invention, which makes this method less complex than known methods of the state of the art. Furthermore, a bad influence of vacuum or overpressure on the distribution of the adhesive in the board and, thus, instabilities of the produced board resulting from such bad influence can be avoided.

Furthermore, in the method according to the present invention, an additional pre-compression step for pre-compressing (or pre-pressing) the spreading material mat is not necessary. Thus, one complete method step compared with the methods known in the state of the art can be saved. Therefore, the method according to the present invention is more cost-effective, more time-saving and less complex.

Since the reinforcement material is not applied over the whole extent of the spreading material mat in its longitudinal direction but only within one or more reinforcement zones, only a low amount of reinforcement material is needed and, thus also for this reason, the method according to the invention is more cost-effective than other methods known from the state of the art.

Since the reinforcement material is applied perpendicular to the conveying direction within one or more transversal reinforcement zones, it is possible to easily conduct the appliance of the reinforcement material while the spread glued particulate material is conveyed on the conveyer. Thus, the appliance of the reinforcement material can be easily integrated in a completely continuous process for producing the board. Therefore, also for this reason, the method according to the invention is time-saving.

Following this, the method according to the invention is a cost-effective and time-saving method for the production of a board from which panels with reinforced edges can be produced, wherein these reinforced edges have an increased mechanical stability.

It is particularly preferred that the reinforcement material is applied to the spread glued particulate material perpendicular to the conveying direction during forming the spreading material mat. Thus, the reinforcement material can be directly applied into the core regions of the spreading material mat or between single layers of the glued particulate material. In this way, an even better and even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

A preferred embodiment of the method according to the invention is characterized in that the reinforcement material is applied to the spread glued particulate material perpendicular to the conveying direction
    during forming the spreading material mat, and/or
    after forming the spreading material mat and before any pressing of the spreading material mat
such that the spreading material mat has a plurality of transversal reinforcement zones that are preferably arranged equidistant to each other.

The sum of the transversal reinforcement zones do not extend over the whole extent of the spreading material mat in its longitudinal direction. In other words, the sum of the extents of the transversal reinforcement zones in the longitudinal direction of the spreading material mat is smaller than the extent of the spreading material mat in its longitudinal direction. Since each of the transversal reinforcement zones is parallel to the transversal direction of the spreading material mat or the board, all transversal reinforcement zones are parallel to each other.

Preferably, each of the transversal reinforcement zones extends over the whole width of the spreading material mat, i.e. over the whole extent of the spreading material mat in its transversal direction.

Preferably, each of the transversal reinforcement zones has a constant width, i.e. has a constant extent in the longitudinal direction of the spreading material mat.

For example, the reinforcement material is applied to the spread glued particulate material perpendicular to the conveying direction
    during forming the spreading material mat, and/or
    after forming the spreading material mat and before any pressing of the spreading material mat
such that the spreading material mat has three, four or five transversal reinforcement zones.

Preferably, the transversal reinforcement zones are arranged equidistant to each other. This means that the distance between each pair of transversal reinforcement zones lying next to each other is the same. In this context, the distance between a first and a second transversal reinforcement zone is the shortest distance between the transversal centre line of the first transversal reinforcement zone and the transversal centre line of the second transversal reinforcement zone, wherein a transversal centre line of a reinforcement zone is a line that is parallel to the transversal direction of the spreading material mat and that has the same distance to both transversal edges of the reinforcement zone. In this connection, a transversal edge of a transversal reinforcement zone is an edge that is parallel to the transversal direction of the spreading material mat.

For example, if the spreading material mat or the board exhibits three transversal reinforcement zones that are arranged equidistant to each other, wherein the second zone lies between the first zone and the third zone, the distance between the first zone and the second zone would be equal to the distance between the second zone and the third zone, i.e. the distance between the transversal centre line of the first zone and the transversal centre line of the second zone would be equal to the distance between the transversal centre line of the second zone and the transversal centre line of the third zone.

Thus, it is preferred that the distance between two transversal reinforcement zones is kept constant over the whole production time. Furthermore, it is preferred that this constant distance is synchronized to potential transversal cuts with which the board is cut into panels. This can be achieved by either simply measuring the travelled distance of the conveyor or by adding a detectable marker at the injection position. In this way, an easy automatic cutting of the board can be realized while it can be ensured that the reinforcement zones are arranged along the edges of the panels produced from the obtained board, and thus these panels exhibit reinforced edges.

In a further preferred embodiment, the extent of the at least one transversal reinforcement zone in the longitudinal direction of the spreading material mat is from 6 mm to 140 mm, preferably from 12 mm to 90 mm, more preferably from 20 mm to 50 mm.

Moreover, it is preferred that the at least one transversal reinforcement zone has two transversal (outer) edges that are parallel to the transversal direction of the spreading material mat, wherein the at least one transversal reinforcement zone comprises two transversal reinforcement subzones containing the reinforcement material and one transversal cutting zone that does not contain the reinforcement material and that is located between the two transversal reinforcement subzones such that it has the same distance to both transversal (outer) edges of the at least one transversal reinforcement zone. In other words, each transversal reinforcement zone comprises two transversal reinforcement subzones containing the reinforcement material and one transversal cutting zone that does not contain the reinforcement material and that is located between the two transversal reinforcement subzones such that the two transversal reinforcement subzones have the same width, i.e. the same extent in the longitudinal direction of the spreading material mat. When the board it cut into panels in its transversal direction in the transversal reinforcement zone(s), the board may be cut in the cutting zone(s) of the transversal reinforcement zone(s). In this way, cutting of the board is simplified since the board is cut in a small region that does not contain the reinforcement material, and thus does not have a high mechanical stability, while the edges of the resulting panels are reinforced edges since a reinforcement zone is located in these edges.

Preferably, the transversal cutting zone has such a width that the whole cutting zone can be cut away by cutting the board into panels or can be milled away by providing the produced panels with locking profile elements. Preferably, the extent of the transversal cutting zone in the longitudinal direction of the spreading material mat is from 1 mm to 50 mm, more preferably from 5 mm to 30 mm, most preferably from 8 mm to 15 mm.

A further preferred embodiment of the method according to the invention is characterized in that the at least one transversal reinforcement has two transversal edges that are parallel to the transversal direction of the spreading material mat and comprises a transversal centre region that is parallel to the transversal direction of the spreading material mat, wherein the concentration of the reinforcement material decreases gradually from the transversal centre region to one or both of the two transversal edges of the at least one reinforcement zone. The transversal centre region may have any width that is smaller than the width of its transversal reinforcement zone. In this context, the width of the transversal centre region is the extent of the transversal centre region in the longitudinal direction of the spreading material mat. Preferably, the extent of the transversal centre region in the longitudinal direction of the spreading material mat is from 6 mm to 140 mm, more preferably from 12 mm to 90 mm, most preferably from 20 mm to 50 mm. According to this preferred embodiment, the transversal reinforcement zone comprises a transversal centre region, wherein the reinforcement material can be present in a constant (relatively high) concentration over the whole centre region. In the remaining regions of the transversal reinforcement zone, the concentration increases from one or both transversal edges of the reinforcement zone to the centre region. In this way, a smooth transition from areas without reinforcement material to the centre region of the reinforcement zone having a relatively high concentration of reinforcement material can be obtained. Consequently, an abrupt transition from non-reinforced areas of the produced board to highly reinforced areas of the produced board and thus an abrupt change in mechanical properties is avoided. Since locations of a board (or panels produced from such board) with such abrupt transitions or changes in mechanical properties tend to easily break if they are exposed to mechanical stress, the avoidance of such abrupt transitions is very advantageous with respect to the stability of the produced board or the produced panels.

In the case that the at least one transversal reinforcement comprises a transversal centre region and a transversal cutting zone, the transversal cutting zone is arranged in that transversal centre region of the at least one transversal reinforcement zone. Thus, the transversal centre region comprises a transversal cutting zone that does not contain the reinforcement material and that is located between two transversal reinforcement subzones of the at least one transversal reinforcement zone such that the transversal cutting zone has the same distance to both transversal edges of the at least one transversal reinforcement zone. In this case, the reinforcement material may be present in a constant (relatively high) concentration over the whole centre region except in the transversal cutting zone in which the reinforcement material is not present. The transversal cutting zone has a width that is smaller than the width of the transversal centre region. In this context, the width is the extent in the longitudinal direction of the spreading material mat. As already explained above, the presence of the transversal cutting zone simplifies the cutting of the board into panels since the board can be cut in the transversal subzone that does not comprise the reinforcement material.

A further preferred embodiment of the method according to the invention is characterized in that
- the at least one transversal reinforcement zone has a distance from the top surface and/or the bottom surface of the spreading material mat of at least 10 mm, preferably of at least 20 mm, more preferably of at least 40 mm, most preferably of at least 60 mm, or
- the at least one transversal reinforcement zone extends substantially over the whole thickness of the spreading material mat.

When the at least one transversal reinforcement zone extends substantially over the whole thickness of the spreading material mat, a good and homogeneous distribution of the reinforcement material is achieved. Thus, the mechanical stability of the edges of the panels produced from the board by cutting the board in the transversal reinforcement zones is increased. The thickness of the spreading material mat is the extent of the spreading material mat in the direction that is perpendicular to the longitudinal direction of the spreading material mat and that is perpendicular to the transversal direction of the spreading material mat.

In a further preferred embodiment of the method according to the invention, the reinforcement material is applied to the spread glued particulate material such that the spreading material mat has additional corner reinforcement zones extending from the at least one transversal reinforcement zone in the longitudinal direction of the spreading material mat. Preferably, the extent of each additional corner reinforcement zone is smaller than or equal to the width of the at least one transversal reinforcement zone. In this context, the width of the at least one transversal reinforcement zone is the extent of the at least one transversal reinforcement zone in the longitudinal direction of the spreading material mat. With this preferred embodiment, not only the edges themselves of panels produced from the obtained board can be reinforced, but also the corner regions between these reinforced edges and the adjacent edges of panels. Thus, an even higher mechanical stability of the reinforced edges of the panels produced from the board can be achieved. Producing such corner reinforcement zones can, for example, easily be achieved by using a suitably designed injection needle assembly for applying the reinforcement material.

It is particularly preferred that the reinforcement material is applied to the spread glued particulate material transversal to the conveying direction
  by spraying and/or sputtering during forming the spreading material mat, and/or
  by injecting after forming the spreading material mat and before any pressing of the spreading material mat.

Thus, the reinforcement material can be directly applied into the core regions of the spreading material mat or between single layers of the glued particulate material. In this way, an even better and even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

In a further preferred embodiment, the reinforcement material is applied to the spread glued particulate material by at least one reinforcement material addition means that is located above the conveyor (preferably within the spreading sector), wherein the at least one reinforcement material addition means is preferably at least one nozzle and/or at least one injection needle assembly with injection needles. With this preferred embodiment, an easy and precise application of the reinforcement material is possible during forming the spreading material mat. By using injection needles, the reinforcement material can be easily applied over the whole thickness of reinforcement zone also after forming the spreading material mat. Thus, an even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

It is particularly preferred that the reinforcement material is applied to the spread glued particulate material transversal to the conveying direction
  by at least one nozzle during forming the spreading material mat, and/or
  by at least one injection needle assembly with injection needles after forming the spreading material mat and before any pressing of the spreading material mat.

A further preferred embodiment of the method according to the invention is characterized in that the reinforcement material is applied to the spread glued particulate material by at least one injection needle assembly with injection needles, the injection needle assembly being mounted at an injection needle assembly moving means. In this regard, it is preferred that, at the start of an injection sector, the injection needle assembly is moved downwards such that the injection needles are penetrated in vertical direction into the spread glued particulate material, then the injection needle assembly is moved (horizontally) in conveying direction with the same speed as the spread glued particulate material is conveyed on the conveyor while the reinforcement material is injected to the spread glued particulate material by the injection needles, afterwards, at the end of the injection sector, the injection needle assembly is moved upwards in vertical direction such that the injection needles are pulled out of the spread glued particulate material in vertical direction, and then the injection needle assembly is moved back to the start of the injection sector. An injection sector is a local region in which the reinforcement material is injected into the spread glued particulate material. With this preferred embodiment, an easy, fast and precise application of the reinforcement material is possible. Furthermore, the reinforcement material can be applied while the spread glued particulate material is continuously conveyed on the conveyor. Furthermore, by such horizontal movement of the injection needles (i.e. movement in conveying direction) and an additionally corresponding vertical movement of the injection needles, a clean and purely vertical injection path of the needles is achieved, and the spreading material mat is only minimally perturbed. Preferably, the vertical movement of the injection needles is a non-rotary movement. Thus, an even less perturbation of the spreading material mat can be achieved.

Preferably the injection needle assembly is bar-formed.

It is particularly preferred that the reinforcement material is applied to the spread glued particulate material by at least two injection needle assemblies with injection needles. Preferably, the at least two injection needle assemblies are mounted at the same injection needle assembly moving means. It is also preferred that the at least two injections needle assemblies are moved synchronously by the injection needle assembly moving means.

It is also possible that, when the injection needle assembly is moved (horizontally) in conveying direction with the same speed as the spread glued particulate material is conveyed on the conveyor, the injection needle assembly is additionally moved vertically upwards and/or downwards while the reinforcement material is injected to the spread glued particulate material by the injection needles. In this way, a columnar injection of the reinforcement material into the spread glued particulate material is possible.

In its simplest form, the injection needle assembly can be realized in the form of a moving spiked roller (or an assembly of several rollers), in which the spikes are developed into injection needles.

Furthermore, it is preferred that the injection needle assembly moving means is
  an injection needle carousel comprising at least one carousel band at which at least one injection needle assembly is mounted, or
  a combination of an injection needle assembly x-axis transport means that moves the injection needle assembly in horizontal direction and an injection needle assembly y-axis transport means that moves the injection needle assembly in vertical direction.

Preferably, the injection needle carousel comprises at least one carousel band at which at least two injection needle assemblies are mounted. Preferably, the injection needle assembly x-axis transport means is an injection sleigh with an injection sleigh transport means and/or the injection needle assembly y-axis transport means is a pneumatic means, a hydraulic means or an electro-mechanic means.

Using an injection needle carousel is a simple and efficient way to achieve a horizontal and vertical movement of the at least one injection needle assembly. Furthermore, this is also a simple and efficient way to achieve a simultaneous horizontal and vertical movement of at least two injection needle assemblies. Such a carousel may be realized in the form of two rotating bands, one at each of the two edges of the conveyor. Onto these rotating bands one or more injection needle assemblies in the general form of bars can be mounted. This embodiment has the advantage that it can be efficiently realized in a small space between a spreading head for spreading the glued particulate material and a press for pressing the spreading material mat. However, moving at least two injection needle assemblies simultaneously leads to the problem that it is rather difficult to feed and control the injection needles from a reinforcement material reservoir through reinforcement material transport and controlling means such as simple cords and cables. This can however be overcome by feeding and controlling the injection needles through axles, by periodically topping up a secondary reservoir which rotates together with the injection needle assemblies when they are traveling back and/or by the addition of battery powered and remote controlled elements such as radio controlled elements.

Using a combination of an injection needle assembly x-axis transport means and an injections needle assembly y-axis transport has the advantage that all parts can easily be fed and controlled by simple cords and/or cables so that a reinforcement material transport and controlling means can be easily and cheaply realized. Preferably, high speeds and accelerations of the injection needle assembly x-axis transport means are realized. The moving parts are preferably light weight constructions.

Each injection needle can be directly connected to a reinforcement material inlet which in turn can be connected to a reinforcement material reservoir by reinforcement material transport means. If then, for example, a pressure pulse is given onto the reinforcement material reservoir, all injection needles could simultaneously inject reinforcement material into the spreading material mat.

Preferably, all injection needles have the exact same diameter for a homogeneous distribution.

Moreover, it is preferred that each of the injection needles comprises a syringe piston and a syringe cylinder. Since the reinforcement material may be sticky, e.g. sticky glue or resin, the injection needles can easily clog or congest during long time operation. One way to minimize clogging of the injection needles is by employing sufficiently high internal pressure during injection. This can be achieved by designing the injection needles to comprise a syringe piston in a syringe cylinder. The syringe pistons can be either controlled individually or collectively by e.g. syringe pusher rods connected to an e.g. hydraulically moved pusher plate. In cooperation with dosage valves, not only high internal pressures, but also exact total dosage amounts and even dosage profiles in function of the injection depth can be realized.

The injection needles can comprise reinforcement material exit zones at their tips through which the reinforcement material exits the injection needle towards the spread glued particulate material. The sum of the reinforcement material exit zones at the tips of the injection needles can together form a three dimensional array. This array can be modified and adapted to produce reinforcement zones of a desired shape. For example, the three dimensional array can be modified to optimally fit the needs of to-be-formed locking profile elements of the panels produced from the obtained board. Thereby those parts of the locking profile elements which are expected to experience high mechanical loadings can be reinforced accordingly. To give an example, if the locking profile elements were be realized in the form of a tongue- and groove locking system, the future tongue zone could be specifically reinforced. To give another example, the future zone where the transversal cut will occur in order to form panels from the board may only be provide with little or no reinforcement material in order to ease cutting and save reinforcement material.

In a further preferred embodiment, the injection needles are cleaned by at least one cleaning means. Preferably, the at least one cleaning means is selected from
 at least one wiper plate with holes through which the injection needles can move upward and downward,
 brushes,
 air-bursts,
 showers, and
 combinations thereof.

As the injection needles are expected to be operated during extended production runs, it would be advantageous that no material accumulates and sticks to the sides of the injection needles over time, since otherwise they would punch unduly broad holes in the spreading material mat. To counteract such accretion at the injection needles, cleaning means are provisioned. One embodiment of such cleaning means can be realized in the form of a wiper plate. Such a wiper plate has holes through which the injection needles move for injection. When the injection needles are moved upward and out of their injection position in the spread glued particulate material, they are wiped clean by a relative vertical movement to the wiper plate. Such a wiper plate can also serve the double function of smoothening or pre-pressing the surface of the spread glued particulate material after the injection.

Alternatively, injection needle cleaning means might be realized in the form of brushes, air-bursts, showers or the like. Furthermore, the wiper plate itself can be cleaned periodically by further horizontal wiper means.

A further preferred embodiment of the method according to the invention is characterized in that the reinforcement material is applied to the spread glued particulate material by a plurality of locally fixed nozzle assemblies that are arranged above the conveyor in the spreading sector and that each periodically apply an amount of the reinforcement material to the spread glued particulate material during forming the spreading material mat, wherein each nozzle assembly comprises a plurality of nozzles that are arranged in a line perpendicular to the conveying direction, wherein the nozzle assemblies are arranged successively in conveying direction and are arranged equidistantly to each other, and wherein the speed of the conveyor and the periodical applying of the nozzle assemblies are synchronized such that the reinforcement material is applied by each nozzle assembly to a same predefined region of the spread glued particulate material. With this preferred embodiment, an easy, fast and precise application of the reinforcement material is possible. It is particularly advantageous that moving the nozzle assemblies is not necessary and thus the appliance of the reinforcement material is simplified.

A further preferred embodiment is characterized in that, additionally, the reinforcement material is applied to the spread glued particulate material parallel to the conveying direction by spraying, sputtering and/or injecting
 during forming the spreading material mat and/or
  after forming the spreading material mat and before any pressing of the spreading material mat such that the spreading material mat additionally has at least one longitudinal reinforcement zone containing the reinforcement material. Thus, the produced board comprises at least one longitudinal reinforcement zone and at least one transversal reinforcement zone. Consequently, with this preferred embodiment, a board is obtained from which panels with at least one reinforced longitudinal edge and with at least one reinforced transversal edge and also panels with three or four reinforced edges can be produced by cutting the board longitudinally in the at least one longitudinal reinforcement zone and transversally in the at least one transversal reinforcement zone.

Preferably the application of the reinforcement material to the spread glued particulate material parallel to the conveying direction is accomplished in the same manner as the application of the reinforcement material to the spread glued particulate material perpendicular to the conveying direction.

In a further preferred embodiment, the adhesive and the reinforcement material are the same material, wherein the adhesive and/or the reinforcement material is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof. By using the same material as adhesive and as reinforcement material, incompatibilities of different materials, which may lead to a decrease of stability, can be avoided. Furthermore, the method is simplified since only one material is used.

Preferably, the reinforcement material is liquid. Furthermore, it is preferred that the reinforcement material is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof. With these materials, a high mechanical stability of the reinforcement zones of the produced board and thus also of the reinforced edges of the panels produced from such board can be achieved.

Furthermore, it is preferred that the particulate wooden material is selected from the group consisting of wood fibres, wood dust, wood chips, wood strands, and mixtures thereof. It is particularly preferred that the particulate wooden material is wood fibres.

In a further preferred embodiment, the board is cut or sawn at least once in the transversal direction of the board into a plurality of boards, wherein, by cutting or sawing the board in its transversal direction, the board is cut or sawn in the at least one transversal reinforcement zone.

In this context, it is preferred that each of boards of the plurality of boards is provided with at least one upper layer, wherein the at least one upper layer is preferably selected from the group consisting of primer layers, décor layers, polymer layers, lacquer layers, sound insulation layers, moisture protection layers, wear resistant layers, backing layers, and combinations thereof. For example, the board is provided with a resin soaked paper layer, a décor layer, a layer of resin soaked abrasion-resistant particles, a primer layer, and/or an overlay. The layers may be provided by printing, spraying, coating, sputtering, or combinations thereof. Preferably the layers are provided by printing, more preferably by direct printing.

The present invention also relates to a board for production of panels and producible with a method according to the present invention, the board having a top surface and having a bottom surface, and the board having a longitudinal direction and having a transversal direction perpendicular to the longitudinal direction, wherein the board comprises at least one transversal reinforcement zone containing a reinforcement material. From such a board, panels with reinforced edges can be produced while the board itself can be produced cost-effectively since only a low amount of reinforcing material is needed.

According to the invention, the board has at least one transversal reinforcement zone. In this context, a reinforcement zone is a zone of the board in which the reinforcement material is located. The at least one transversal reinforcement zone is transversal, which means that the at least one transversal reinforcement zone is parallel to the transversal direction of the board. The at least one transversal reinforcement zone has two transversal edges, i.e. edges being parallel to the transversal direction of the board. Preferably, the at least one transversal reinforcement zone has the form of a line, a stripe, or a bar, in particular a straight line, a straight stripe, or a straight bar.

The transversal reinforcement zone may include a transversal cutting zone that does not contain the reinforcement material, i.e. a transversal cutting zone in which the reinforcement material is not located. When the board is cut in this cutting zone, a simplified cutting of the board is possible while, at the edges of the resulting panels, a reinforcement zone is located.

The transversal reinforcement zone is only a zone, i.e. a partial region, of the board. In detail, the transversal reinforcement zone has a limited extent in the longitudinal direction of the board. In other words, the transversal reinforcement zone does not extend over the whole extent of the board in its longitudinal direction. In other words, the extent of the transversal reinforcement zone in the longitudinal direction of the board is smaller than the extent of the board in its longitudinal direction.

Preferably, the at least one transversal reinforcement zone extends over the whole width of the board, i.e. over the whole extent of the board in its transversal direction.

Preferably, the at least one transversal reinforcement zone has a constant width, i.e. has a constant extent in the longitudinal direction of the board.

The board according to the invention is producible (or produced) with the method according to the invention, i.e. the method of producing a board for production of panels.

Since the board according to the invention has been produced by the method according to the present invention, the at least one transversal reinforcement zone of the board is at least one precisely defined reinforced region in which the reinforcement substance is homogeneously distributed. Due to this homogeneous distribution, the at least one reinforcement zone of the board can withstand higher mechanical loading, i.e. the at least one reinforcement zone of the board has a higher mechanical stability. Thus, the board according to the invention differs from other boards known from the state of the art in that the at least transversal reinforcement zone is more precisely defined and in that the reinforcement material is more homogeneously distributed in the at least one transversal reinforcement zone. Furthermore, the at least one transversal reinforcement zone of the board according to the invention has a higher mechanical stability than the reinforcement zones of boards known from the state of the art. These differences are consequences of the fact that the board according to the invention has been produced with the method according to the invention.

From the board according to the invention, panels can be produced by cutting the board in its transversal direction in the at least one transversal reinforcement zone. In this way, panels are obtained that have reinforced edges that can withstand higher mechanical loading, i.e. the reinforced edges have a higher mechanical stability.

Thus, the at least one transversal reinforcement zone is preferably at least one predefined zone in which the produced board should be cut (in its transversal direction) in panels in the future such that each of the resulting panels comprises at least one reinforced edge.

In a further preferred embodiment, the board is an endless board.

A further preferred embodiment of the board according to the invention is characterized in that the board has a plurality of transversal reinforcement zones.

The sum of the transversal reinforcement zones do not extend over the whole extent of the board in its longitudinal direction. In other words, the sum of the extents of the transversal reinforcement zones in the longitudinal direction of the board is smaller than the extent of the board in its longitudinal direction. Since each of the transversal reinforcement zones is parallel to the transversal direction of the board, all transversal reinforcement zones are parallel to each other.

Preferably, each of the transversal reinforcement zones extends over the whole width of the board, i.e. over the whole extent of the board in its transversal direction.

Preferably, each of the transversal reinforcement zones has a constant width, i.e. has a constant extent in the longitudinal direction of the board.

For example, the board has three, four or five transversal reinforcement zones.

Preferably, the transversal reinforcement zones are arranged equidistant to each other. This means that the distance between each pair of transversal reinforcement zones lying next to each other is the same. In this context, the distance between a first and a second transversal reinforcement zone is the shortest distance between the transversal centre line of the first transversal reinforcement zone and the transversal centre line of the second transversal reinforcement zone, wherein a transversal centre line of a reinforcement zone is a line that is parallel to the transversal direction of the board and that has the same distance to both transversal edges of the reinforcement zone. In this connection, a transversal edge of a transversal reinforcement zone is an edge that is parallel to the transversal direction of the board.

For example, if the board exhibits three transversal reinforcement zones that are arranged equidistant to each other, wherein the second zone lies between the first zone and the third zone, the distance between the first zone and the second zone would be equal to the distance between the second zone and the third zone, i.e. the distance between the transversal centre line of the first zone and the transversal centre line of the second zone would be equal to the distance between the transversal centre line of the second zone and the transversal centre line of the third zone.

Moreover, its preferred that the extent of the at least one transversal reinforcement zone in the longitudinal direction of the board is from 6 mm to 140 mm, preferably from 12 mm to 90 mm, more preferably from 20 mm to 50 mm.

Furthermore, it is preferred that the at least one transversal reinforcement zone has two transversal (outer) edges that are parallel to the transversal direction of the board, wherein the at least one transversal reinforcement zone comprises two transversal reinforcement subzones containing the reinforcement material and one transversal cutting zone that does not contain the reinforcement material and that is located between the two transversal reinforcement subzones such that it has the same distance to both transversal (outer) edges of the at least one transversal reinforcement zone. In other words, each transversal reinforcement zone comprises two transversal reinforcement subzones containing the reinforcement material and one transversal cutting zone that does not contain the reinforcement material and that is located between the two transversal reinforcement subzones such that the two transversal reinforcement subzones have the same width, i.e. the same extent in the longitudinal direction of the board. When the board it cut into panels in its transversal direction in the transversal reinforcement zone(s), the board may be cut in the cutting zone(s) of the transversal reinforcement zone(s). In this way, cutting of the board is simplified since the board is cut in a small region that does not contain the reinforcement material, and thus does not have a high mechanical stability, while the edges of the resulting panels are reinforced edges since a reinforcement zone is located in these edges.

Preferably, the transversal cutting zone has such a width that the whole cutting zone can be cut away by cutting the board into panels or can be milled away by providing the produced panels with locking profile elements. Preferably, the extent of the transversal cutting zone in the longitudinal direction of the board is from 1 mm to 50 mm, more preferably from 5 mm to 30 mm, most preferably from 8 mm to 15 mm.

A further preferred embodiment of the board according to the invention is characterized in that the at least one transversal reinforcement has two longitudinal edges that are parallel to the transversal direction of the board and comprises a transversal centre region that is parallel to the transversal direction of the board, wherein the concentration of the reinforcement material decreases gradually from the transversal centre region to one or both of the two transversal edges of the at least one reinforcement zone. The transversal centre region may have any width that is smaller than the width of its transversal reinforcement zone. In this context, the width of the transversal centre region is the extent of the transversal centre region in the longitudinal direction of the board. Preferably, the extent of the transversal centre region in the longitudinal direction of the board is from 6 mm to 140 mm, more preferably from 12 mm to 90 mm, most preferably from 20 mm to 50 mm. According to this preferred embodiment, the transversal reinforcement zone comprises a transversal centre region, wherein the reinforcement material can be present in a constant (relatively high) concentration over the whole centre region. In the remaining regions of the transversal reinforcement zone, the concentration increases from one or both transversal edges of the reinforcement zone to the centre region. In this way, a smooth transition from areas without reinforcement material to the centre region of the reinforcement zone having a relatively high concentration of reinforcement material can be obtained. Consequently, an abrupt transition from non-reinforced areas of the produced board to highly reinforced areas of the produced board and thus an abrupt change in mechanical properties is avoided. Since locations of a board (or panels produced from such board) with such abrupt transitions or changes in mechanical properties tend to easily break if they are exposed to mechanical stress, the avoidance of such abrupt transitions is very advantageous with respect to the stability of the produced board or the produced panels.

In the case that the at least one transversal reinforcement comprises a transversal centre region and a transversal cutting zone, the transversal cutting zone is arranged in that transversal centre region of the at least one transversal reinforcement zone. Thus, the transversal centre region comprises a transversal cutting zone that does not contain the reinforcement material and that is located between two transversal reinforcement subzones of the at least one transversal reinforcement zone such that the transversal cutting zone has the same distance to both transversal edges of the at least one transversal reinforcement zone. In this case, the reinforcement material may be present in a constant (relatively high) concentration over the whole centre region except in the transversal cutting zone in which the reinforcement material is not present. The transversal cutting zone has a width that is smaller than the width of the transversal centre region. In this context, the width is the extent in the longitudinal direction of the board. As already explained above, the presence of the transversal cutting zone simplifies the cutting of the board into panels since the board can be cut in the transversal subzone that does not comprise the reinforcement material.

A further preferred embodiment of the board according to the invention is characterized in that
- the at least one transversal reinforcement zone has a distance from the top surface and/or the bottom surface of the board of at least 5 mm, preferably of at least 10 mm, more preferably of at least 20 mm, most preferably of at least 30 mm, or
- the at least one transversal reinforcement zone (6, 6') extends substantially over the whole thickness of the board.

When the at least one transversal reinforcement zone extends substantially over the whole thickness of the board, a good and homogeneous distribution of the reinforcement material is achieved. Thus, the mechanical stability of the edges of the panels produced from the board by cutting the board along the transversal reinforcement zones is increased. The thickness of the board is the extent of the board in the direction that is perpendicular to the longitudinal direction of the board and that is perpendicular to the transversal direction of the board.

Furthermore, it is preferred that the board according to the invention is a chipboard, an oriented strand board, a medium-density fibre board, or a high-density fibre board.

Moreover, it is preferred that the board according to the invention has at least one upper layer, wherein the at least one upper layer is preferably selected from the group consisting of primer layers, décor layers, polymer layers, lacquer layers, sound insulation layers, moisture protection layers, wear resistant layers, backing layers, and combinations thereof.

In a further preferred embodiment, the board according to the invention is characterized in that the board has additional corner reinforcement zones extending from the at least one transversal reinforcement zone in the longitudinal direction of the board. Preferably, the extent of each additional corner reinforcement zone is smaller than or equal to the extent of the at least one transversal reinforcement zone in the longitudinal direction of the board. With this preferred embodiment, not only the edges themselves of panels produced from the obtained board can be reinforced, but also the corner regions between these reinforced edges and the adjacent edges. Thus, an even higher mechanical stability of the reinforced edges of the panels produced from the board can be achieved. Producing such corner reinforcement zones can, for example, easily be achieved by using a suitably designed injection needle assembly for applying the reinforcement material. Preferably, the corner reinforcement zones have a triangular shape.

The present invention also relates to a method of producing a spreading material mat, the method comprising the following steps:
a) Providing particulate material comprising or consisting of particulate wooden material,
b) Producing glued particulate material by applying an adhesive to the particulate material,
c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
wherein a reinforcement material is applied to the spread glued particulate material perpendicular to the conveying direction
during forming the spreading material mat and/or
after forming the spreading material mat and before any pressing of the spreading material mat
such that the spreading material mat has at least one transversal reinforcement zone containing the reinforcement material.

The application of the reinforcement material is accomplished by spraying, sputtering and/or injecting the reinforcement material onto and/or into the spread glued particulate material.

The details described above also apply for the method for producing the spreading material mat.

The present invention also relates to a spreading material mat producible by the method according to the present invention, the spreading material mat having a top surface and having a bottom surface, and the spreading material mat having a longitudinal direction and having a transversal direction, wherein the spreading material mat comprises at least one transversal reinforcement zone containing a reinforcement material.

The spreading material mat according to the invention is producible or produced by the method according to the invention, i.e. the method of producing a spreading material mat.

The present invention also relates to a method of producing panels, the method comprising the features of the method according to the invention of producing at least one board for production of panels, characterized in that, the board is cut or sawn at least once in the longitudinal direction of the board and at least once in the transversal direction of the board into a plurality of panels, wherein, by cutting or sawing the board in its transversal direction, the board is cut or sawn in the at least one transversal reinforcement zone such that each of the resulting panels comprises at least one reinforced edge.

Thus, the method of producing panels at least comprises the steps:
a) Providing particulate material comprising or consisting of particulate wooden material,
b) Producing glued particulate material by applying an adhesive to the particulate material,
c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector, d) Producing a board by pressing the spreading material mat, wherein a reinforcement material is applied to the spread glued particulate material perpendicular to the conveying direction by spraying, sputtering and/or injecting during forming the spreading material mat, and/or after forming the spreading material mat and before any pressing of the spreading material mat such that the spreading material mat has at least one transversal reinforcement zone containing the reinforcement material, and wherein the board produced in step d) is cut or sawn at least once in the longitudinal direction of the board and at least once in the transversal direction of the board into a plurality of panels, wherein, by cutting or sawing the board in its transversal direction, the board is cut or sawn along the at least one transversal reinforcement zone such that each of the resulting panels comprises at least one reinforced edge.

Since the reinforcement material is applied to the spread glued particulate material during forming the spreading material mat, and/or after forming the spreading material mat and before any pressing of the spreading material mat, the reinforcement material is distributed better and more homogeneously in the reinforcement zone. Thus, the at least one reinforced edge of the produced panels can withstand higher mechanical loading. Furthermore, a precise appliance of the reinforcement material is possible, i.e. it is possible to homogeneously distribute the reinforcement material in precisely defined regions of the spread glued particulate material. Following this, it is possible with the method according to the present invention to obtain panels with one or more precisely defined reinforced zones at their edges in which the reinforcement substance is homogeneously distributed. Moreover, using overpressure or vacuum for distributing the already applied reinforcement material is not necessary in the method according to the present invention, which makes this method less complex than known methods of the state of the art. Furthermore, in the method according to the present invention, an additional pre-compression step for pre-compressing (or pre-pressing) the spreading material mat is not necessary. Thus, one complete method step compared with the methods known in the state of the art can be saved. Therefore, the method according to the present invention is more cost-effective, more time-saving and less complex. Since the reinforcement material is not applied over the whole length of the spreading material mat but only within one or more reinforcement zones, only a low amount of reinforcement material is needed and, thus, the method according to the invention is more cost-effective than other methods known from the state of the art. Since the reinforcement material is applied perpendicular to the conveying direction within one or more transversal reinforcement zones, it is possible to easily conduct the appliance of the reinforcement material while the spread glued particulate material is conveyed on the conveyer. Thus, the appliance of the reinforcement material can be easily integrated in a completely continuous process for producing the board or the panel. Therefore, the method according to the invention is time-saving. Following this, the method according to the invention is a cost-effective and time-saving method for the production of panels with reinforced edges, wherein these reinforced edges have an increased mechanical stability.

All preferred features and embodiments described for the method according to the invention of producing at least one board for production of panels also rely to the method according to the invention of producing panels.

Preferably, the board is cut or sawn along the at least one transversal reinforcement zone such that each of the resulting panels comprises at least two reinforced edges.

It is particularly preferred that the board is cut or sawn along the at least one transversal reinforcement zone such that the at least one transversal reinforcement zone is halved.

Preferably, the distance between two reinforcement zones is kept constant over the whole production time. Furthermore, it is preferred that this constant distance is synchronized to the transversal cuts with which the board is cut into panels. This can be achieved by either simply measuring the travelled distance of the conveyor or by adding a detectable marker at the injection position. In this way, an easy automatic cutting of the board can be realized while it can be ensured that the reinforcement zones are arranged along the edges of the produced panels such that these panels exhibit reinforced edges.

Furthermore, it is preferred that the at least one reinforced edge is at least one transversal reinforced edge.

Preferably, the cutting or sawing takes place while the board is conveyed on the conveyor.

In a further preferred embodiment of the method for producing panels according to the invention, a locking profile element is machined, preferably pressed or milled, to the at least one reinforced edge of each panel, wherein the locking profile element is preferably selected from the group consisting of tongues, lips, hooks, grooves, snap action surfaces, and combinations thereof. Edges of panels that exhibit a locking profile element are especially susceptible to fracture. Thus, it is very advantageous that a panel edge exhibiting a locking profile element is produced as a reinforced edge according to the method of the invention, since thus the locking profile element has a significantly higher mechanical stability.

Preferably, the reinforcement material is selectively applied in predefined locations of the spread glued particulate material in which future locking profile elements are arranged. Thus, it is possible to adapt the shape or form of the transversal reinforcement zone to the shape or form of the future locking profile element such that the reinforced zones at the edges of the panels are perfectly fitted to the locking profile elements of the panels.

A further preferred embodiment of the method for producing panels according to the invention is characterized in that the board additionally has at least one longitudinal reinforcement zone wherein, by cutting or sawing the board in its longitudinal direction, the board is cut or sawn in the at least one longitudinal reinforcement zone. Consequently, with this preferred embodiment, panels with at least one reinforced longitudinal edge and at least one reinforced transversal edge and also panels with three or four reinforced edges can be produced.

It is particularly preferred that the board is cut or sawn in the at least one longitudinal reinforcement zone such that the at least one longitudinal reinforcement zone is halved.

The present invention also relates to a panel producible or produced by the method according to the invention, the panel having two longitudinal edges and two transversal edges, wherein, along at least one of the longitudinal edges and/or along at least one of the transversal edges, a reinforcement zone containing a reinforcement material is arranged, such that the panel comprises at least one reinforced edge. Thus, at least one of the two longitudinal edges of the panel is a reinforced edge and/or at least one of the two transversal edges of the panel is a reinforced edge.

It is preferred that, along at least one of the transversal edges of the panel, a reinforcement zone containing a reinforcement material is arranged, such that the panel comprises at least one reinforced transversal edge. In this case, at least one of the two transversal edges of the panel is a reinforced edge.

The panel according to the invention is producible or produced by the method according to the invention, i.e. the method of producing panels.

A further preferred embodiment of the panel according to the invention is characterized in that, along each of the longitudinal edges and/or along each of the transversal edges, a reinforcement zone containing a reinforcement material is arranged. Thus, both longitudinal edges are reinforced edges containing a reinforcement material and/or both transversal edges are reinforced edges containing a reinforcement material.

It is particularly preferred that, along each of the transversal edges of the panel, a reinforcement zone containing a reinforcement material is arranged. In this case, both transversal edges of the panel are reinforced edges.

A further preferred embodiment of the panel according to the invention is characterized in that the panel has additional corner reinforcement zones extending from the at least one reinforcement zone in a direction perpendicular to the edge along which the reinforcement zone is arranged. Preferably, the extent of each additional corner reinforcement zone is smaller than or equal to the double width of the at least one transversal reinforcement zone. In this context, the width of the at least one transversal reinforcement zone is the extent of the at least one transversal reinforcement zone in the longitudinal direction of the panel. The longitudinal direction of the panel is the direction that is parallel to the longitudinal edges (long-side edges) of the panel. With this preferred embodiment, not only the edges themselves of the panel are reinforced, but also the corner regions between these reinforced edges and the adjacent edges. Thus, an even higher mechanical stability of the reinforced edges of the panel can be achieved. Producing such corner reinforcement zones can, for example, easily be achieved by using a suitably designed injection needle assembly for applying the reinforcement material. Preferably, the corner reinforcement zones have a triangular shape.

In a further preferred embodiment of the panel according to the invention, the reinforcement zone
  has a distance from the top surface and/or the bottom surface of the panel of at least 5 mm, preferably of at least 10 mm, more preferably of at least 20 mm, most preferably of at least 30 mm, or
  extends substantially over the whole thickness of the panel.

Furthermore, it is preferred that the panel according to the invention is a chip panel, an oriented strand panel, a medium-density fibre panel, or a high-density fibre panel.

Moreover, it is preferred that the panel according to the invention has at least one upper layer, wherein the at least one layer is preferably selected from the group consisting of primer layers, décor layers, polymer layers, lacquer layers, sound insulation layers, moisture protection layers, wear resistant layers, backing layers, and combinations thereof.

In a further preferred embodiment of the panel according to the invention, the at least one reinforced edge has a locking profile element, wherein the locking profile element is preferably selected from the group consisting of tongues, lips, hooks, grooves, snap actions surfaces, and combinations thereof. Edges of panels that exhibit a locking profile element are especially susceptible to fracture. Thus, it is very advantageous that a panel edge exhibiting a locking profile element is a reinforced edge, since thus the locking profile element has a significantly higher mechanical stability.

The present invention also relates to the use of a panel according to the present invention as floor panel, wall panel, and/or ceiling panel.

The present invention also relates to an apparatus for producing at least one board for production of panels, the apparatus comprising
  a gluing device for applying an adhesive to a particulate material which comprises or consists of particulate wooden material and thus producing glued particulate material,
  a conveyor on which the glued particulate material can be conveyed in a conveying direction,
  a spreading head for homogeneously spreading the glued particulate material onto the conveyor within a spreading sector such that a spreading material mat having a longitudinal direction parallel to the conveying direction and having a transversal direction perpendicular to the longitudinal direction of the spreading material mat can be formed on the conveyer and the spread glued particulate material is accumulated to the spreading material mat in conveying direction over the length of the spreading sector,
  at least one continuous belt press for producing a board by pressing the spreading material mat, and
  at least one reinforcement material addition means for applying a reinforcement material to the spread glued particulate material
    during forming the spreading material mat and/or
    after forming the spreading material mat and before any pressing of the spreading material mat
  such that the spreading material mat has at least one transversal reinforcement zone containing the reinforcement material.

A preferred embodiment of the apparatus according to the invention is characterized in that the at least one reinforcement material addition means is at least one injection needle assembly with injection needles, wherein the apparatus further comprises an injection needle assembly moving means at which the injection needle assembly is mounted. Preferably, the injection needle assembly moving means is suitable for moving the injection needle assembly vertically and horizontally such that, at a start of an injection sector, the injection needle assembly can be moved downwards such that the injection needles are penetrated in vertical direction into the spread glued particulate material, then the injection needle assembly can be moved in conveying direction with the same speed as the spread glued particulate wooden material is conveyed while the reinforcement material can be injected to the spread glued particulate wooden material by the injection needles, afterwards, at the end of the injection sector, the injection needle assembly can be moved upwards such that the injection needles are pulled out of the spread glued particulate material in vertical direction, and then the injection needle assembly can be moved back to the start of the injection sector. An injection sector is a local region in which the reinforcement material is injected into the spread glued particulate material. With this preferred embodiment, an easy, fast and precise application of the reinforcement material is possible. Furthermore, the reinforcement material can be applied while the spread glued particulate material is continuously conveyed on the conveyor. Furthermore, by such horizontal movement of the injection needles (i.e. movement in conveying direction) and an additionally corresponding vertical movement of the injection needles, a clean and purely vertical injection path of the needles is achieved, and the spreading material mat is only minimally perturbed. Preferably, the vertical movement of the injection needles is a non-rotary movement. Thus, an even less perturbation of the spreading material mat can be achieved.

Preferably the injection needle assembly is bar-formed.

It is particularly preferred that the apparatus comprises at least two injection needle assemblies with injection needles as reinforcement material addition means. Preferably, the at least two injection needle assemblies are mounted at the same injection needle assembly moving means. It is also preferred that the at least two injections needle assemblies can be moved synchronously by the injection needle assembly moving means.

In its simplest form, the injection needle assembly can be realized in the form of a moving spiked roller (or an assembly of several rollers), in which the spikes are developed into injection needles.

In a further preferred embodiment of the apparatus according to the invention, the injection needle assembly moving means is
- an injection needle carousel comprising at least one carousel band at which at least one injection needle assembly is mounted, or
- a combination of an injection needle assembly x-axis transport means suitable for moving the injection needle assembly in horizontal direction and an injection needle assembly y-axis transport means suitable for moving the injection needle assembly in vertical direction.

Preferably, the injection needle carousel comprises at least one carousel band at which at least two injection needle assemblies are mounted. Preferably, the injection needle assembly x-axis transport means is an injection sleigh with an injection sleigh transport means and/or the injection needle assembly y-axis transport means is a pneumatic means, a hydraulic means or an electro-mechanic means.

Using an injection needle carousel is a simple and efficient way to achieve a horizontal and vertical movement of the at least one injection needle assembly. Furthermore, this is also a simple and efficient way to achieve a simultaneous horizontal and vertical movement of at least two injection needle assemblies. Such a carousel may be realized in the form of two rotating bands, one at each of the two edges of the conveyor. Onto these rotating bands one or more injection needle assemblies in the general form of bars can be mounted. This embodiment has the advantage that it can be efficiently realized in a small space between a spreading head for spreading the glued particulate material and a press for pressing the spreading material mat. However, moving at least two injection needle assemblies simultaneously leads to the problem that it is rather difficult to feed and control the injection needles from a reinforcement material reservoir through reinforcement material transport and controlling means such as simple cords and cables. This can however be overcome by feeding and controlling the injection needles through axles, by periodically topping up a secondary reservoir which rotates together with the injection needle assemblies when they are traveling back and/or by the addition of battery powered and remote controlled elements such as radio controlled elements.

Using a combination of an injection needle assembly x-axis transport means and an injections needle assembly y-axis transport has the advantage that all parts can easily be fed and controlled by simple cords and/or cables so that a reinforcement material transport and controlling means can be easily and cheaply realized. Preferably, x-axis transport means can be moved with high speeds and accelerations. The moving parts are preferably light weight constructions.

Each injection needle can be directly connected to a reinforcement material inlet which in turn can be connected to a reinforcement material reservoir by reinforcement material transport means. If then, for example, a pressure pulse is given onto the reinforcement material reservoir, all injection needles could simultaneously inject reinforcement material into the spreading material mat.

Preferably, all injection needles have the exact same diameter for a homogeneous distribution.

A further preferred embodiment of the apparatus according to the invention is characterized in that each of the injection needles comprises a syringe piston and a syringe cylinder. Since the reinforcement material may be sticky, e.g. sticky glue or resin, the injection needles can easily clog or congest during long time operation. One way to minimize clogging of the injection needles is by employing sufficiently high internal pressure during injection. This can be achieved by designing the injection needles to comprise a syringe piston in a syringe cylinder. The syringe pistons can be either controlled individually or collectively by e.g. syringe pusher rods connected to an e.g. hydraulically moved pusher plate. In cooperation with dosage valves, not only high internal pressures, but also exact total dosage amounts and even dosage profiles in function of the injection depth can be realized.

The injection needles can comprise reinforcement material exit zones at their tips through which the reinforcement material exits the injection needle towards the spread glued particulate material. The sum of the reinforcement material exit zones at the tips of the injection needles can together form a three dimensional array. This array can be modified and adapted to produce reinforcement zones of a desired shape. For example, the three dimensional array can be modified to optimally fit the needs of to-be-formed locking profile elements of the panels produced from the obtained board. Thereby those parts of the locking profile elements which are expected to experience high mechanical loadings can be reinforced accordingly. To give an example, if the locking profile elements were be realized in the form of a tongue- and groove locking system, the future tongue zone could be specifically reinforced. To give another example, the future zone where the transversal cut will occur in order to form panels from the board may only be provide with little or no reinforcement material in order to ease cutting and save reinforcement material.

Furthermore, it is preferred that the apparatus further comprises at least one cleaning means for cleaning the injection needles. Preferably, the at least one cleaning means is selected from
- at least one wiper plate with holes through which the injection needles can move upward and downward,
- brushes,
- air-bursts,
- showers, and
- combinations thereof.

As the injection needles are expected to be operated during extended production runs, it would be advantageous that no material accumulates and sticks to the sides of the injection needles over time, since otherwise they would punch unduly broad holes in the spreading material mat. To counteract such accretion at the injection needles, cleaning means are provisioned. One embodiment of such cleaning means can be realized in the form of a wiper plate. Such a wiper plate has holes through which the injection needles move for injection. When the injection needles are moved upward and out of their injection position in the spread glued particulate material, they are wiped clean by a relative vertical movement to the wiper plate. Such a wiper plate can also serve the double function of smoothening or pre-pressing the surface of the spread glued particulate material after the injection.

Alternatively, injection needle cleaning means might be realized in the form of brushes, air-bursts, showers or the like. Furthermore, the wiper plate itself can be cleaned periodically by further horizontal wiper means.

In a further preferred embodiment of the apparatus according to the invention, the at least one reinforcement material addition means is a plurality of locally fixed nozzle assemblies that are arranged above the conveyor in the spreading section and that are each suitable for periodically applying an amount of the reinforcement material to the spread glued particulate material during forming of the spreading material mat, wherein each nozzle assembly comprises a plurality of nozzles that are arranged in a line perpendicular to the conveying direction, wherein the nozzle assemblies are arranged successively in conveying direction and are arranged equidistantly to each other, and wherein the apparatus is configured such that the speed of the conveyor and the periodical applying of the nozzle assemblies are synchronized such that the reinforcement material is applied by each nozzle assembly to a same predefined region of the spread glued particulate material. With this preferred embodiment, an easy, fast and precise application of the reinforcement material is possible. It is particularly advantageous that moving the nozzle assemblies is not necessary and thus the appliance of the reinforcement material is simplified.

In a further preferred embodiment, the apparatus according to the invention is characterized in that it comprises a device for cutting or sawing the board in the transversal direction of the board into a plurality of boards wherein the device for cutting or sawing the board in its transversal direction is arranged and configured such that the board is cut or sawn in the at least one transversal reinforcement zone. Preferably, the device for cutting or sawing board is synchronized with the at least one reinforcement material addition means and the conveyor. For example, the apparatus is configured such that the speed and frequency of the device for cutting or sawing the board in its transversal direction is synchronized with the speed of the conveyor and the (e.g. periodical) applying of the at least one reinforcement material addition means. In this way, it can be achieved that the board is cut or sawn in the at least one transversal reinforcement zone.

A further preferred embodiment of the apparatus according to the invention is characterized in that the apparatus comprises a device for providing the board with at least one upper layer, wherein the device for providing the board with at least one upper layer is preferably selected from the group consisting of printing devices, coating devices, spraying devices, sputtering devices, and combinations thereof. The at least one upper layer is preferably selected from the group consisting of primer layers, décor layers, polymer layers, lacquer layers, sound insulation layers, moisture protection layers, wear resistant layers, backing layers, and combinations thereof. For example, the at least one upper layer is a resin soaked paper layer, a décor layer, a layer of resin soaked abrasion-resistant particles, a primer layer, and/or an overlay. It is particularly preferred that the layers are provided by printing, preferably direct printing.

The present invention also relates to an apparatus for producing panels comprising the features of the apparatus for producing at least one board for production of panels according to the invention, characterized in that the apparatus comprises at least one device for cutting or sawing the board in its longitudinal direction, preferably a longitudinally aligned saw, and/or at least one device for cutting or sawing the board in its transversal direction, preferably a diagonal saw Thus the apparatus for producing panels at least comprises a gluing device for applying an adhesive to a particulate material which comprises or consists of particulate wooden material and thus producing glued particulate material, a conveyor on which the glued particulate material can be conveyed in a conveying direction, a spreading head for homogeneously spreading the glued particulate material onto the conveyor within a spreading sector such that a spreading material mat having a longitudinal direction parallel to the conveying direction and having a transversal direction perpendicular to the longitudinal direction of the spreading material mat can be formed on the conveyer and the spread glued particulate material is accumulated to the spreading material mat in conveying direction over the length of the spreading sector, at least one continuous belt press for producing a board by pressing the spreading material mat, at least one reinforcement material addition means for applying a reinforcement material to the spread glued particulate material during forming the spreading material mat and/or after forming the spreading material mat and before any pressing of the spreading material mat such that the spreading material mat has at least one transversal reinforcement zone containing the reinforcement material, and at least one device for cutting or sawing the board in its longitudinal direction, preferably a longitudinally aligned saw, and/or at least one device for cutting or sawing the board in its transversal direction, preferably a diagonal saw.

All preferred features and embodiments described for the apparatus according to the invention for producing at least one board for production of panels also rely to the apparatus according to the invention for producing panels.

A further preferred embodiment is characterized in that the apparatus comprises a device for machining a locking profile element to at least one reinforced edge of each panel, wherein the device for machining a locking profile element is preferably a miller.

The present invention is explained in more detail with reference to the subsequent figures and preferred embodiments without restricting the invention to the specific parameters represented there.

FIG. 1 shows a perspective view of a specific embodiment of a panel 1 according to the invention. The panel 1 has two longitudinal edges 2, 2' (long side edges) and two transversal edges 3, 3' (short side edges). Along each of the transversal edges 3, 3', a reinforcement zone 6, 6' containing a reinforcement material is arranged such that both transversal edges 3, 3' are reinforced edges. The first transversal edge 3 has a hook shaped profile as a second locking profile element 5 which fits into a corresponding first locking profile element 4 that is located at the second transversal edge 3'. Both locking profile elements are located in the reinforcement zones 6, 6'. While the reinforcement zones 6, 6' are drawn along sharp lines in FIG. 1, it is emphasized that in preferred embodiments there is a preferably gradual transition from the non-reinforced zones to the reinforcement zones 6, 6' in order to avoid abrupt changes in mechanical properties, which again would result zones that tend to easily break along such abrupt transitions.

Figure 2:
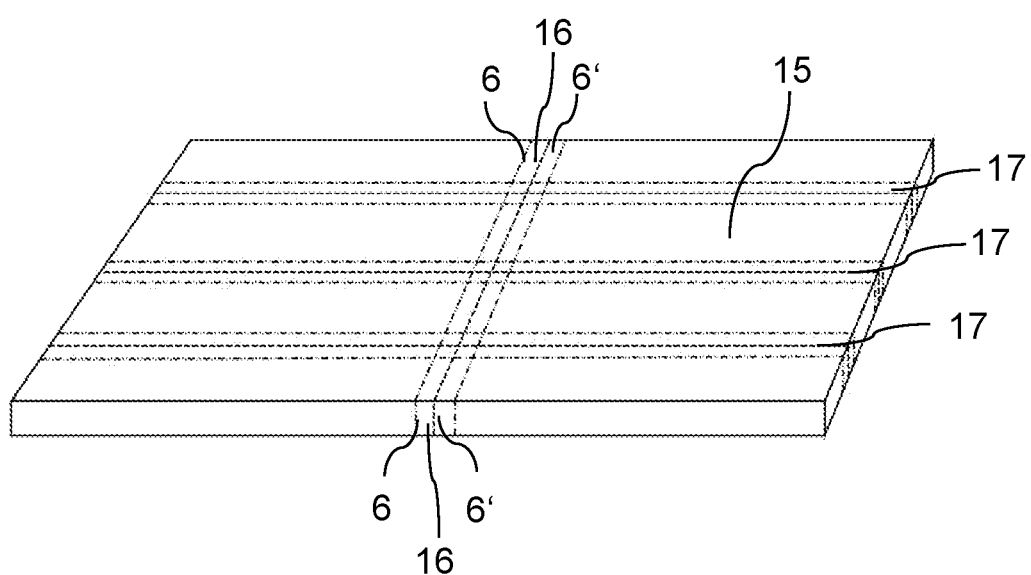
FIG. 2 shows a perspective view of a specific embodiment of a board 15 according to the present invention.

FIG. 2 shows a perspective view of a specific embodiment of a board 15 according to the invention. In the course of the manufacturing of the panels according to the present invention, the panels are usually cut from a board 15 which is considerably larger than the final panels. The board 15 is usually produced in a continuous belt press 14 such as in an MDF production process and thus can have an "endless" length. For this reason, the board 15 is normally cut transversally 16 and longitudinally 17 in order to produce panels of the desired final size. In subsequent production steps, connection means in the form of locking profile elements 4, 5 are formed or milled at the thereby produced transversal edges 3, 3' of the panels 1. Since such locking profile elements usually contain parts which are stressed with high mechanical loads, it is advantageous to provide reinforcement zones 6, 6' along the transversal edges 3, 3'. In FIG. 2, it can be seen that the board 15 is cut transversally 16 in each of the transversal reinforcement zones 6, 6' such that each transversal reinforcement zone 6, 6' is halved. The resulting halves are located on different panels while each of the halves is an own reinforcement zone 6, 6' of the corresponding panel.

Figure 3:
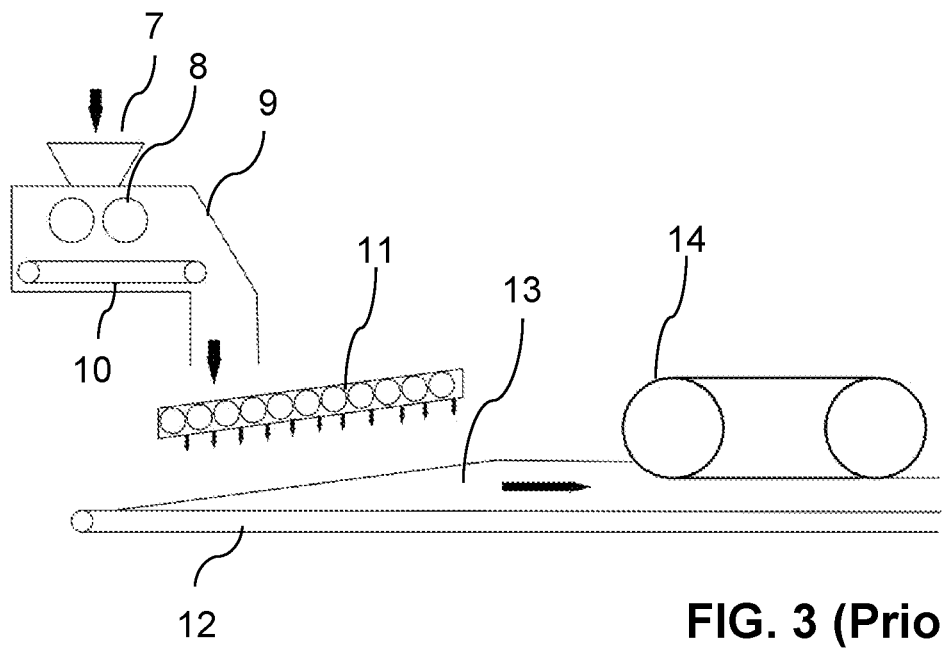
FIG. 3 shows a simplified side view of a spreading process as known in the art.

FIG. 3 shows a simplified side view of an example of a board manufacturing process as known in the art. Specifically, it shows a spreading and pressing process for MDF/HDF fiber boards. In this example, pre-glued wood fibers are passed through a chute 7 onto breaking rollers 8 for a first even distribution onto a metering conveyor 10. The thereby metered and distributed fibers subsequently leave the spreading material bunker 9 to fall onto a spreading head 11. Such a spreading head 11 may consist of e.g. vibrating screens or a series of rotating distribution drums and has the objective to lay a homogeneous spreading material mat 13 onto a conveyor 12 over the length of a spreading sector that starts at the beginning of the spreading head 11 and ends at the end of the spreading head 11. The homogeneous spreading material mat 13 is then usually passed to a variety of optional steps such as further homogenization of the mat 13 or pre-pressing and is then passed to a press, which usually is in the form of a continuous band press 14 in which the initially porous material is both compacted and in which the glue is cured at normally elevated temperatures and elevated pressures.

Figure 4:
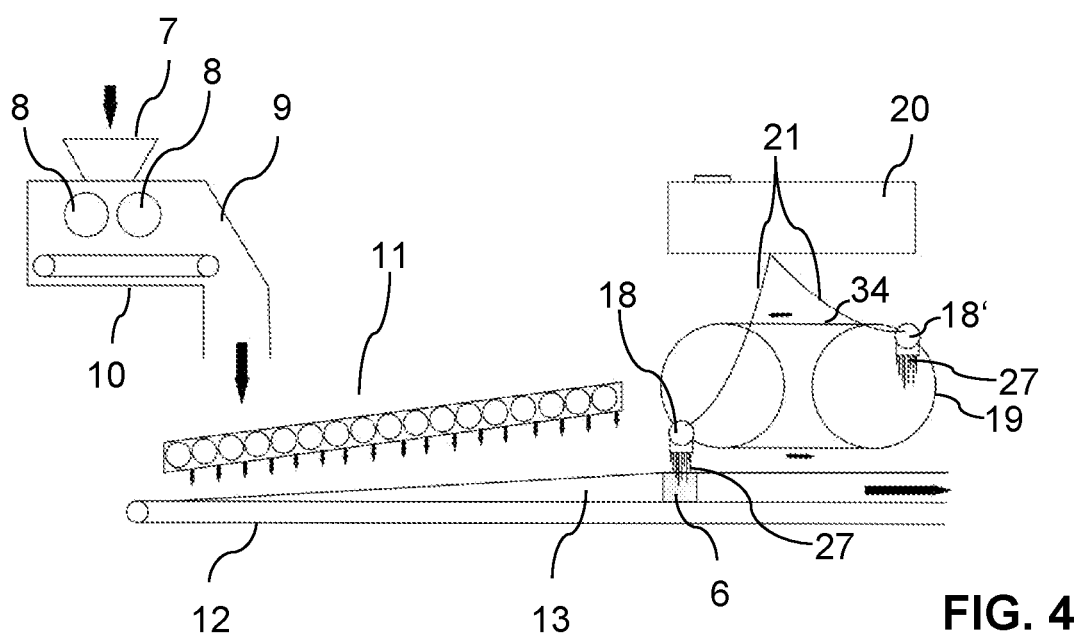
FIG. 4 shows a simplified side view of a specific embodiment of the method of producing a board for production of panels according to the present invention and a specific embodiment of the apparatus for producing at least one board for production of panels according to the invention.

FIG. 4 shows a simplified side view of a specific embodiment of the method and the apparatus for producing a board according to the invention. In comparison to the method and the device shown in FIG. 3, an additional reinforcement step and reinforcement means according to the present invention has been added. For this reinforcement step, reinforcement material is added into the up to then homogeneous and porous spreading material mat 13, before it enters the press 14 (not shown in FIG. 4). The reinforcement is achieved by injecting a preferably liquid reinforcement material through a series of injection needles 27 mounted onto an injection needle assembly 18 into predefined reinforcement zones 6, 6'.

In its simplest form (not shown in the Figures), the injection needle assembly 18 can be realized in the form of a moving spiked roller (or an assembly of several rollers), in which the spikes are developed into injection needles 27. However, such a spiked roller tends to overly mechanically perturb the porous spreading material mat 13.

According to the preferred embodiment in FIG. 4, one or more generally bar-formed injection needle assemblies 18, 18' are moved synchronously and at the same speed with the spreading material mat 13 horizontally, while the injection needles 27 penetrate the spreading material mat 13 vertically. By this synchronous horizontal movement of the injection needles 27 and an additionally corresponding vertical, non rotary movement of the injection needles 27, a clean and purely vertical injection path if the injection needles 27 is achieved, and the spreading material mat 13 is only minimally perturbed. A simple and efficient way to implement such a simultaneous horizontal- and vertical movement of the injection needle assemblies 18, 18' is by mounting the injection needle assemblies 18, 18' onto an injection needle carousel 19. Such an injection needle carousel 19 may be realized in the form of two rotating carousel bands 35, one at each of the two edges of the spreading material belt conveyor 12. Onto these rotating carousel bands 35 one or more injection needle assemblies 18, 18' in the general form of bars are mounted. This embodiment has the advantage that it can be efficiently realized in a small space between the spreading head 11 and the continuous belt press 14. However, it simultaneously has the disadvantage in that it is rather difficult to feed and control the injection needles 27 from a reinforcement material reservoir 20 through reinforcement material transport and controlling means 21 such as simple cords and cables. This can however be overcome by feeding and controlling the injection needles 27 through axles, by periodically topping up a secondary reservoir which rotates together with the injection needle assemblies 18, 18' when they are traveling back and/or by the addition of battery powered and remote controlled elements such as radio controlled elements.

Figure 5:
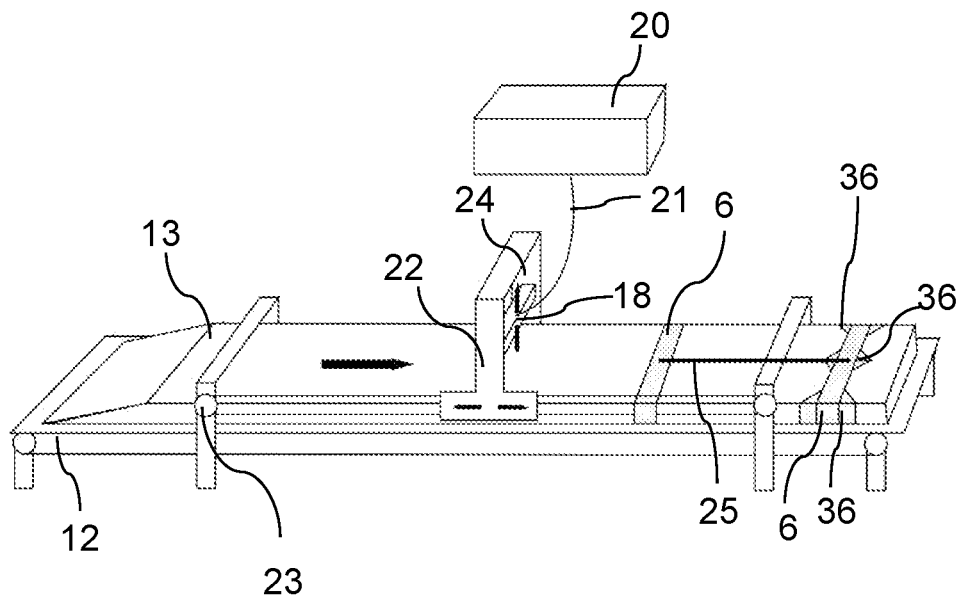
FIG. 5 shows a simplified perspective view of a further specific embodiment of the method of producing a board for production of panels according to the present invention and a specific embodiment of the apparatus for producing at least one board for production of panels according to the invention.

FIG. 5 shows a simplified perspective view of a further specific embodiment of the method and the apparatus for producing a board according to the invention. In this embodiment, one (or more) injection needle assemblies 18, 18' are moved periodically by two independent x- and y-axis transport means, i.e. an injection needle assembly x-axis transport means and an injection needle assembly y-axis transport means 24. In the shown embodiment, the injection needle assembly x-axis transport means is an injection sleigh 22 which is moved by an injection sleigh transport means 23 in the direction of the conveyor 12 during the injection process and in the opposite direction when not injecting. The injection needle assembly 18 (or assemblies 18, 18') is moved in a vertical direction by injection needle assembly y-axis transport means 24 which can be realized as pneumatic, hydraulic or electro-mechanic means which move a yoke onto which the needle assembly 18 (or assemblies 18, 18') is mounted. Reinforcement in reinforcement zones 6, 6' is then realized by an injection which is equivalent to the one described above in connection with FIG. 4.

The embodiment of FIG. 5 has the advantage that all parts can easily be fed and controlled by simple cords and/or cables so that the reinforcement material transport and controlling means 21 are easily and cheaply realized. However, since the speeds of the conveyor 12 can be quite high, this embodiment takes up more space along the conveyor 12 in order to facilitate the periodic backward movement of the sleigh, and furthermore high speeds and accelerations of the injection sleigh 22 need to be realized, demanding light weight construction of the moving parts.

FIG. 5 also shows that the reinforcement zones 6 are mainly created as parallel bars in the porous spreading material mat 13, before the spreading material mat 13 enters the continuous belt press 14 (not shown in FIG. 5). During the pressing process, these reinforcement zones will be compressed vertically, but will maintain their horizontal position on the conveyor 12. Since one objective of the present invention is to reinforce the edges 2, 2', 3, 3' of the panels and especially the locking profile elements 4, 5 at said edges, the transversal cuts 16 should be synchronized with the reinforcement zones 6, 6'. This can be achieved by either simply measuring the travelled distance of the conveyor 12 or by adding a detectable marker at the injection position. Thus, the longitudinal distance 25 between two reinforcement zones can be kept constant over the whole production time and synchronized to the transversal cuts 16.

Furthermore, FIG. 5 also shows that not only the transversal edges 3, 3' themselves can be reinforced, but also the corner regions between the longitudinal edges 2, 2' and the transversal edges 3, 3'. This is shown by the corner reinforcement zones 36 in FIG. 5 for the situation where a board is being longitudinally cut into merely two panels. This can easily be achieved by designing the injection needle assembly accordingly to also reinforce corner zones 36.

Figure 6:
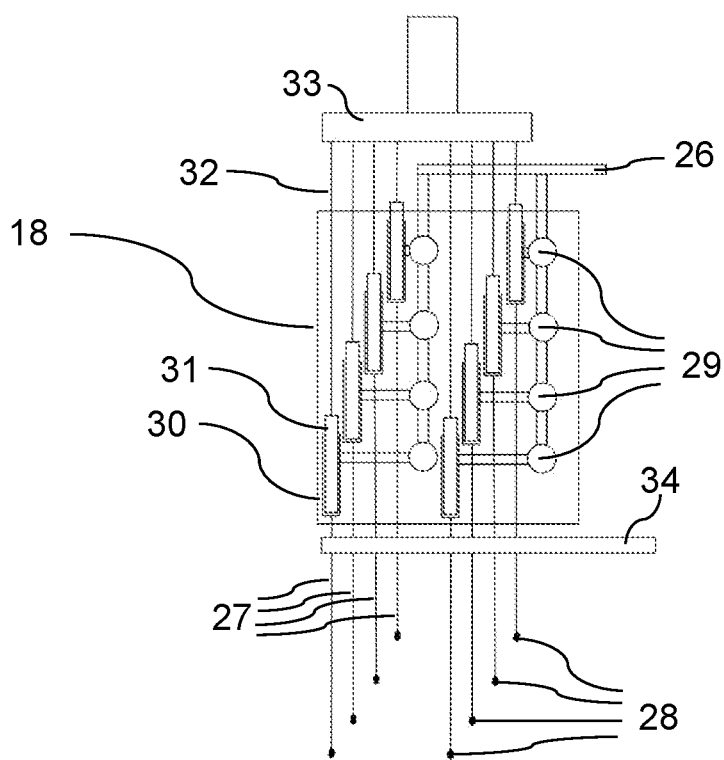
FIG. 6 shows a simplified side view of a further specific embodiment of the method of producing a board for production of panels according to the present invention and a further specific embodiment of the apparatus for producing at least one board for production of panels according to the invention.

FIG. 6 shows a simplified side view of an example of a part of an injection needle assembly 18 used in the method and the apparatus according to the present invention. In this embodiment, an array of injection needles 27 is mounted on an injection needle assembly 18. In its simplest form, each injection needle 27 could be directly connected to the reinforcement material inlet 26 which in turn could be connected to the reinforcement material reservoir 20 by reinforcement material transport means 21. If then for example a pressure pulse is given onto the reinforcement material reservoir 20, all injection needles could simultaneously inject reinforcement material into the spreading material mat 13. In this regard, it is advantageous that all injection needles 27 have the exact same diameter for a homogeneous distribution and that the injection needles 27 never clog during operation. Because sticky glue and resins are to be injected in preferred embodiments and because needles can easily clog or congest during long time operation, an improved injection design is preferred.

One way to minimize clogging of the needles 27 is by employing sufficiently high internal pressure during injection. This can be achieved by designing the injection needles to comprise a syringe piston 31 in a syringe cylinder 30. The syringe pistons 31 can be either controlled individually or collectively by e.g. syringe pusher rods 32 connected to an e.g. hydraulically moved pusher plate 33. In cooperation with dosage valves 29, not only high internal pressures, but also exact total dosage amounts and even dosage profiles in function of the injection depth can be realized.

As can be seen in FIG. 6, the sum of the reinforcement material exit zones 28 at the tips of the injection needles 27 together form a three dimensional array. This array can be modified and adapted to produce reinforcement zones 6, 6' which optimally fit the needs of the to-be-formed locking profile elements 4, 5. Thereby those elements of the profiles which are expected to experience high mechanical loadings can be reinforced accordingly. For example if the locking profile elements 4, 5 would be realized in the form of a tongue- and groove locking system, the future tongue zone could be specifically reinforced or the future zone where the transversal cut 16 will occur, little or no reinforcement material could be added in order to ease cutting and save reinforcement material.

As the injection needles 27 are expected to be operated during extended production runs, it would be advantageous that no material accumulates and sticks to the sides of the injection needles 27 over time, since otherwise they would punch unduly broad holes in the spreading material mat 13. To counteract such accretion at the injection needles, cleaning means are provisioned according to the invention. One embodiment of such cleaning means can be realized in the form of a wiper plate 34. Such a wiper plate 34 has holes through which the injection needles 27 move for injection. When the injection needles 27 are moved upward and out of their injection position in the spreading material mat 13, they are wiped clean by a relative vertical movement to the wiper plate 34. Such a wiper plate 34 can also serve the double function of smoothening or prepressing the surface of the spreading material mat 13 after the injection. Alternative injection needle 27 cleaning means might be realized in the form of brushes, air-bursts, showers or the like. Furthermore, the wiper plate 34 itself can be cleaned periodically by further horizontal wiper means.

Figure 7:
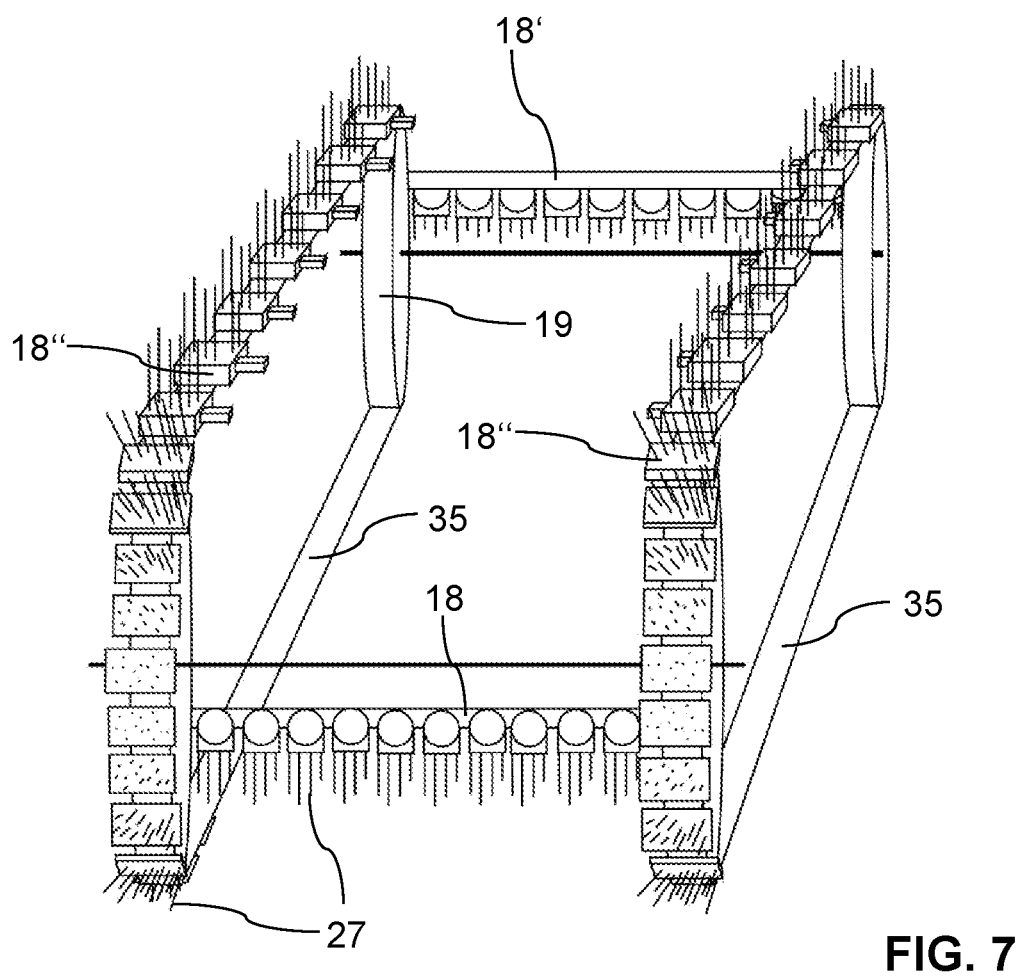
FIG. 7 shows a simplified schematic view of a further specific embodiment of the method of producing a board for production of panels according to the present invention and a further specific embodiment of the apparatus for producing at least one board for production of panels according to the invention.

FIG. 7 shows a simplified schematic view of a further specific embodiment of the method and the apparatus for producing a board according to the invention. This embodiment is similar to the embodiment shown in FIG. 4. Also in this case, one or more generally bar-formed injection needle assemblies 18, 18' are moved synchronously and at the same speed with the spreading material mat 13 (not shown in FIG. 7) horizontally, while the injection needles 27 penetrate the spreading material mat 13 vertically. The injection needle assemblies 18, 18' are mounted onto an injection needle carousel 19 that is realized in the form of two rotating carousel bands 35, one at each of the two edges of the spreading material belt conveyor 12 (not shown in FIG. 7). Onto these rotating carousel bands 35 one or more injection needle assemblies 18, 18' in the general form of bars are mounted.

Furthermore, the apparatus comprises several additional injection needle assemblies 18" that are mounted on and arranged along the rotating carousel bands 35. By rotating the carousel bands 35, these additional injection needle assemblies 18" are moved synchronously and at the same speed with the spreading material mat 13 and rotate around the injection needle carousel 19 while the injection needles 27 penetrate into the spreading material mat 13 such that the reinforcement material can be injected into the spreading material mat 13. Since these additional injection needle assemblies 18" are arranged along the carousel bands 35 which are parallel to the longitudinal direction of the spreading material mat 13, the reinforcement material is additionally applied to the spread glued particulate material parallel to the conveying direction such that the spreading material mat 13 additionally has at least one longitudinal reinforcement zone comprising the reinforcement material.

Figure 8:
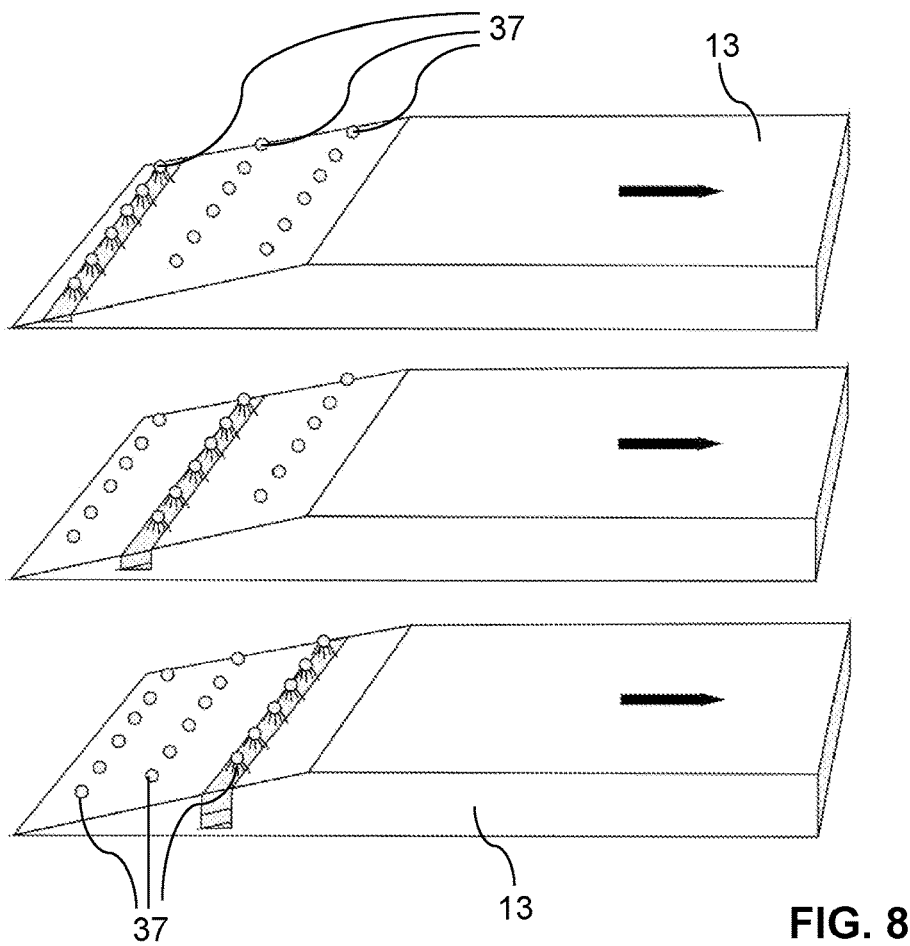
FIG. 8 shows a simplified schematic view of a further specific embodiment of the method for producing a board according to the invention.

FIG. 8 shows a schematic view of a further specific embodiment of the method for producing a board according to the invention. In this embodiment, the reinforcement material is applied to the spread glued particulate material by three locally fixed nozzle assemblies that are arranged above the conveyor 12 (not shown in FIG. 8) in the spreading sector and that each periodically apply an amount of the reinforcement material to the spread glued particulate material during forming the spreading material mat 13. Each of the three nozzle assembly comprises six nozzles 37 that are arranged in a line perpendicular to the conveying direction, wherein the three nozzle assemblies are arranged successively in conveying direction and are arranged equidistantly to each other. It should be noted that FIG. 8 is only a schematic and is very simplified. Thus, several elements of the method and the apparatus according to the invention are not shown in FIG. 8 for reasons of clarity.

FIG. 8 is divided into three subfigures a), b), and c) showing three different stages of the method step in which the reinforcement material is applied to the spread glued particulate material. The first subfigure a) shows a first stage at which the first nozzle assembly applies the reinforcement material to the spread glued particulate material, the second subfigure b) shows a second stage at which the second nozzle assembly applies the reinforcement material to the spread glued particulate material, and the third subfigure c) shows a third stage at which the third nozzle assembly applies the reinforcement material to the spread glued particulate material. Between these three stages, the spread glued particulate material is conveyed by the conveyor in conveying direction. The speed of the conveyor and the periodical applying of the nozzle assemblies are synchronized such that the reinforcement material is applied by each nozzle assembly to a same predefined region of the spread glued particulate material. In other words, at the first stage shown in subfigure a), the predefined region is under the first nozzle assembly, at the second stage shown in subfigure b), the predefined region is under the second nozzle assembly and, at the third stage shown in subfigure c), the predefined region is under the third nozzle assembly. The predefined region corresponds to the transversal reinforcement zone of the produced spreading material mat 13.

With this embodiment, an easy, fast and precise application of the reinforcement material is possible such that at least one transversal reinforcement zone is obtained that extends substantially over the whole thickness of the spreading material mat. It is particularly advantageous that moving the nozzle assemblies is not necessary and thus the appliance of the reinforcement material is simplified.

Figure 9:
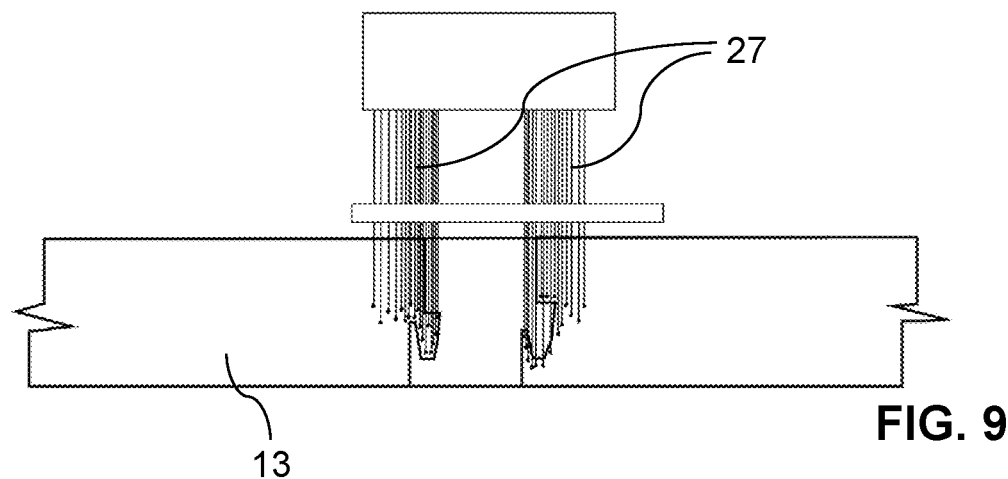
FIG. 9 shows a simplified schematic side view of a first stage of a further specific embodiment of the method for producing a board according to the invention.
Figure 10:
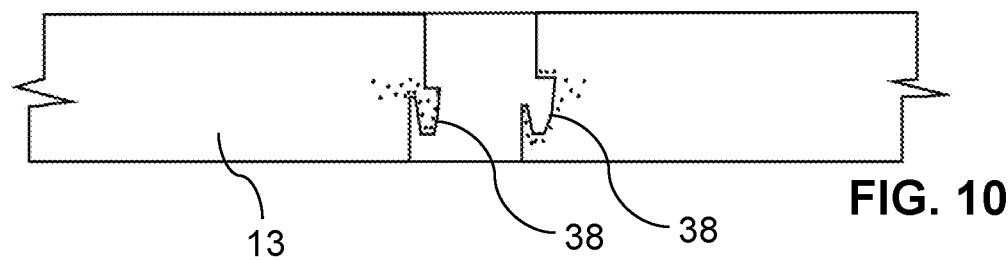
FIG. 10 shows a simplified schematic side view of a second stage of the specific embodiment of the method for producing a board according to the invention shown in FIG. 9.
Figure 11:
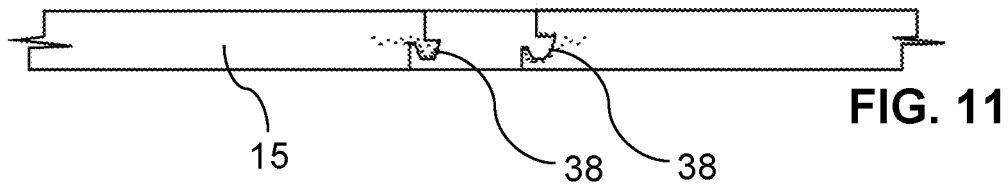
FIG. 11 shows a simplified schematic side view of a third stage of the specific embodiment of the method for producing a board according to the invention shown in FIGS. 9 and 10.

FIGS. 9, 10, and 11 show a schematic side view of a further specific embodiment of the method for producing a board according to the invention wherein future locking profile elements are selectively reinforced. Each of FIGS. 9, 10, and 11 shows one of three different stages of such selective reinforcing.

FIG. 9 shows a first stage, at which injection needles 27 of an injection needle assembly 18 are arranged in the spreading material mat 13. At the lower end of the injections needles 27, droplets of reinforcement material are applied into the spread glued particulate material of the spreading material mat. The injection needles 27 are divided into two groups. Because of this division into two groups, it is possible to produce a transversal reinforcement zone that comprises two transversal reinforcement subzones containing the reinforcement material and one transversal cutting zone that does not contain the reinforcement material and that is located between the two transversal reinforcement subzones.

FIG. 10 shows a second stage, at which the injection needles have already been pulled out of the spreading material mat 13. It can be seen that the reinforcement material has been applied at a specific region that is adapted to future locking profile elements which are indicated by lines 38 in FIGS. 9, 10, and 11. Although it cannot be clearly seen in the side view shown in the Figure, this specific region is a transversal reinforcement zone. In this context, it should be noted that the transversal direction of the spreading material mat 13 is perpendicular to the drawing layer. The transversal reinforcement zone has two transversal edges that are parallel to the transversal direction of the spreading material mat 13. These two transversal reinforcement zones are represented by the most left droplet and by the most right droplet of reinforcement material shown in FIG. 10. Furthermore, the transversal reinforcement zone comprises two transversal reinforcement subzones containing the reinforcement material and one transversal cutting zone that does not contain the reinforcement material and that is located between the two transversal reinforcement subzones such that it has the same distance to both transversal edges of the at least one transversal reinforcement zone. The transversal cutting zone is represented by the region in the Figure that lies between the two indicated future locking profile elements indicated by lines 38 where no reinforcement material is located. The presence of the transversal cutting zone arranged between the two transversal reinforcement subzones is a consequence of the arrangement of the injection needles 27 in first stage shown in FIG. 9 as the injection needles 27 were divided into two groups.

The transversal cutting zone is located in the middle or the centre of the transversal reinforcement zone such that the two transversal reinforcement subzones have the same width, i.e. the same extent in the longitudinal direction of the spreading material mat. When the board it cut into panels in its transversal direction in the transversal reinforcement zone, the board may be cut in the cutting zone of the transversal reinforcement zone. In this way, cutting of the board is simplified since the board is cut in a region that does not contain the reinforcement material, and thus does not have a high mechanical stability, while the edges of the resulting panels are reinforced since they contain the reinforcement material.

FIG. 11 shows a third stage, at which the spreading material mat has already been pressed to a board 15. It can be seen that the reinforcement material is only present in defined locations of the board in which future locking profile elements are arranged that are indicated in the Figure. In particular, the shape of the transversal reinforcement zone has been fitted adapted to the shape of the later locking profile element such that the reinforced zones at the edges of the later panels are perfectly fitted to the locking profile elements of the panels.

In summary, according to this specific embodiment shown in FIGS. 9 to 11, the reinforcement material is selectively applied only in the regions of future locking profile elements while the reinforcement material is not applied to the region in which the board is cut into panels.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

LIST OF REFERENCE SIGNS

1: Panel
2, 2': Longitudinal edges (long side edges)

3, 3': Transversal edges (short side edges)
4: First locking profile element
5: Second locking profile element
6, 6': Reinforcement zone
7: Chute
8: Breaking rollers
9: Spreading material bunker
10: Metering conveyor
11: Spreading head
12: Conveyor
13: Spreading material mat
14: Continuous belt press
15: Board (after press)
16: Transversal cut
17: Longitudinal cut
18, 18', 18": Injection needle assembly
19: Injection needle carousel
20: Reinforcement material reservoir
21: Reinforcement material transport and controlling means
22: Injection sleigh
23: Injection sleigh transport means
24: Injection needle assembly y-axis transport means
25: Longitudinal distance between reinforcement zones
26: Reinforcement material inlet
27: Injection needle
28: Reinforcement material exit zones
29: Dosage valves
30: Syringe cylinder
31: Syringe piston
32: Syringe pusher rod
33: Pusher plate
34: Wiper plate
35: Carousel band
36: Corner reinforcement zone
37: Nozzle
38: Lines indicating future locking profile elements

The invention claimed is:

1. A method comprising:
providing particulate material comprising or consisting of particulate wooden material;
producing glued particulate material by applying an adhesive to the particulate material;
forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector; and
producing a board by pressing the spreading material mat,
wherein a reinforcement material is applied to the spread glued particulate material perpendicular to the conveying direction by spraying, sputtering, and/or injecting during forming the spreading material mat and/or after forming the spreading material mat and before any pressing of the spreading material mat
such that the spreading material mat has at least one transversal reinforcement zone containing the reinforcement material,
wherein the reinforcement material is applied to the spread glued particulate material by at least one injection needle assembly with injection needles, the injection needle assembly being mounted at an injection needle assembly moving means, wherein, at the start of an injection sector, the injection needle assembly is moved downwards such that the injection needles penetrate in vertical direction into the spread glued particulate material, then the injection needle assembly is moved in conveying direction with the same speed as the spread glued particulate material is conveyed on the conveyor while the reinforcement material is injected to the spread glued particulate material by the injection needles, afterwards, at the end of the injection sector, the injection needle assembly is moved upwards in vertical direction such that the injection needles are pulled out of the spread glued particulate material in vertical direction, and then the injection needle assembly is moved back to the start of the injection sector.

2. The method of claim 1, wherein the reinforcement material is applied to the spread glued particulate material perpendicular to the conveying direction
during forming the spreading material mat and/or
after forming the spreading material mat and before any pressing of the spreading material mat
such that the spreading material mat has a plurality of transversal reinforcement zones that are arranged equidistant to each other.

3. The method of claim 1, wherein the extent of the at least one transversal reinforcement zone in the longitudinal direction of the spreading material mat is from 6 mm to 140 mm.

4. The method of claim 1, wherein the at least one transversal reinforcement zone has two transversal edges that are parallel to the transversal direction of the spreading material mat, wherein the at least one transversal reinforcement zone comprises two transversal reinforcement subzones containing the reinforcement material and one transversal cutting zone that does not contain the reinforcement material and that is located between the two transversal reinforcement subzones such that it has the same distance to both transversal edges of the at least one transversal reinforcement zone.

5. The method of claim 1, wherein the at least one transversal reinforcement zone has two transversal edges that are parallel to the transversal direction of the spreading material mat and comprises a transversal centre region that is parallel to the transversal direction of the spreading material mat, wherein the concentration of the reinforcement material decreases gradually from the transversal centre region to one or both of the two transversal edges of the at least one reinforcement zone.

6. The method of claim 1, wherein
the at least one transversal reinforcement zone has a distance from the top surface and/or the bottom surface of the spreading material mat of at least 10 mm, or
the at least one transversal reinforcement zone extends substantially over the whole thickness of the spreading material mat.

7. The method of claim 1, wherein the reinforcement material is applied to the spread glued particulate material such that the spreading material mat has additional corner reinforcement zones extending from the at least one transversal reinforcement zone in the longitudinal direction of the spreading material mat, wherein the extent of each additional corner reinforcement zone is smaller than or equal to the extent of the at least one transversal reinforcement zone in the longitudinal direction of the spreading material mat.

8. The method of claim 1, wherein the injection needle assembly moving means is
an injection needle carousel comprising at least one carousel chain at which at least one injection needle assembly is mounted, or
a combination of an injection needle assembly x-axis transport means, having an injection sleigh with an injection sleigh transport means, that moves the injection needle assembly in transversal direction and an injection needle assembly y-axis transport means, having a pneumatic means, a hydraulic means or an electro-mechanic means, that moves the injection needle assembly in vertical direction.

9. The method of claim 1, wherein
each of the injection needles comprises a syringe piston and a syringe cylinder, or
the injection needles are divided into groups, wherein each of the groups of injection needles comprises a syringe piston and a syringe cylinder.

10. The method of claim 1, wherein the injection needles are cleaned by at least one cleaning means, wherein the at least one cleaning means is selected from at least one wiper plate with holes through which the injection needles can move upward and downward, brushes, air-bursts, showers, and combinations thereof.

11. The method of claim 1, wherein the reinforcement material is applied to the spread glued particulate material by a plurality of locally fixed nozzle assemblies that are arranged above the conveyor in the spreading sector and that each periodically apply an amount of the reinforcement material to the spread glued particulate material during forming the spreading material mat, wherein each nozzle assembly comprises a plurality of nozzles that are arranged in a line perpendicular to the conveying direction, wherein the nozzle assemblies are arranged successively in conveying direction and are arranged equidistantly to each other, and wherein the speed of the conveyor and the periodical applying of the nozzle assemblies are synchronized such that the reinforcement material is applied by each nozzle assembly to a same predefined region of the spread glued particulate material.

12. The method of claim 1, wherein, additionally, the reinforcement material is applied to the spread glued particulate material parallel to the conveying direction by spraying, sputtering, and/or injecting,
during forming the spreading material mat and/or
after forming the spreading material mat and before any pressing of the spreading material mat
such that the spreading material mat additionally has at least one longitudinal reinforcement zone.

13. The method of claim 1, wherein the adhesive and the reinforcement material are the same material, wherein the adhesive and/or the reinforcement material is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof.

14. The method of claim 1, wherein the particulate wooden material is selected from the group consisting of wood fibres, wood dust, wood chips, wood strands, and mixtures thereof.

15. The method of claim 1, wherein the board is cut or sawn at least once in the transversal direction of the board into a plurality of boards, wherein, by cutting or sawing the board in its transversal direction, the board is cut or sawn in the at least one transversal reinforcement zone.

16. The method of claim 15, wherein each of the boards of the plurality of boards is provided with at least one upper layer, wherein the at least one upper layer is selected from the group consisting of primer layers, décor layers, polymer layers, lacquer layers, sound insulation layers, moisture protection layers, wear resistant layers, backing layers, and combinations thereof.

17. A method of producing a spreading material mat, the method comprising the following steps:
providing particulate material comprising or consisting of particulate wooden material,
producing glued particulate material by applying an adhesive to the particulate material,
forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
wherein a reinforcement material is applied to the spread glued particulate material perpendicular to the conveying direction by spraying, sputtering, and/or injecting during forming the spreading material mat and/or
after forming the spreading material mat and before any pressing of the spreading material mat
such that the spreading material mat has at least one transversal reinforcement zone containing the reinforcement material,
wherein the reinforcement material is applied to the spread glued particulate material by at least one injection needle assembly with injection needles, the injection needle assembly being mounted at an injection needle assembly moving means, wherein, at the start of an injection sector, the injection needle assembly is moved downwards such that the injection needles penetrate in vertical direction into the spread glued particulate material, then the injection needle assembly is moved in conveying direction with the same speed as the spread glued particulate material is conveyed on the conveyor while the reinforcement material is injected to the spread glued particulate material by the injection needles, afterwards, at the end of the injection sector, the injection needle assembly is moved upwards in vertical direction such that the injection needles are pulled out of the spread glued particulate material in vertical direction, and then the injection needle assembly is moved back to the start of the injection sector.

18. The method of claim 1 further comprising producing a plurality of panels by: cutting or sawing the board at least once in the longitudinal direction of the board and at least once in the transversal direction of the board into plurality of panels, wherein, by cutting or sawing the board in its transversal direction, the board is cut or sawn in the at least one transversal reinforcement zone such that each of the resulting panels comprises at least one reinforced edge.

\* \* \* \* \*